US011538606B1

(12) United States Patent
Bigbee, Jr. et al.

(10) Patent No.: US 11,538,606 B1
(45) Date of Patent: *Dec. 27, 2022

(54) METAL-CLAD MULTI-CIRCUIT ELECTRICAL CABLE ASSEMBLY

(71) Applicant: Encore Wire Corporation, McKinney, TX (US)

(72) Inventors: William T. Bigbee, Jr., Melissa, TX (US); Micah W. Latimer, Leonard, TX (US); John L. Rhoads, Lewisville, TX (US); Andrew P. Hull, McKinney, TX (US); Troy D. Skidmore, McKinney, TX (US); Paul Abernathy, McKinney, TX (US); David W. Maxey, Gunter, TX (US)

(73) Assignee: Encore Wire Corporation, McKinney, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/212,927

(22) Filed: Mar. 25, 2021

Related U.S. Application Data

(63) Continuation-in-part of application No. 17/135,794, filed on Dec. 28, 2020, which is a continuation of
(Continued)

(51) Int. Cl.
*H01B 11/02* (2006.01)
*H01B 7/22* (2006.01)
(Continued)

(52) U.S. Cl.
CPC ............ *H01B 11/02* (2013.01); *H01B 7/226* (2013.01); *H01B 7/365* (2013.01); *H01B 9/028* (2013.01);
(Continued)

(58) Field of Classification Search
CPC .... H02G 11/02; H02G 15/105; H02G 15/117; H01B 11/00; H01B 11/06; H01B 7/17;
(Continued)

(56) References Cited

U.S. PATENT DOCUMENTS

| 1,668,953 A | 5/1928 | Erickson |
| 1,793,697 A | 5/1929 | Johnson |

(Continued)

FOREIGN PATENT DOCUMENTS

| EP | 3043358 B1 | 7/2016 |
| WO | 20130176601 A1 | 11/2013 |

OTHER PUBLICATIONS

Underwriters Laboratories, "UL Standard for Safety for Armored Cable", UL 4, Fifteenth Edition, Dated Jan. 15, 2004, 31 pages.
(Continued)

*Primary Examiner* — Krystal Robinson
(74) *Attorney, Agent, or Firm* — Warren Rhoades LLP

(57) ABSTRACT

An electrical cable assembly comprising a first electrical circuit comprising at least two insulated conductors, a second electrical circuit, and a conductive metallic armor encasing the first and second electrical circuits, wherein the conductive metallic armor provides a return ground path. The second electrical circuit comprising at least two control insulated conductors, a jacket surrounding the control insulated conductors, and a wrap surrounding the jacket which is surrounding the control insulated conductors.

20 Claims, 24 Drawing Sheets

Related U.S. Application Data application No. 16/790,307, filed on Feb. 13, 2020, now Pat. No. 10,910,131, which is a continuation of application No. 16/443,764, filed on Jun. 17, 2019, now Pat. No. 10,607,752, which is a continuation of application No. 15/374,443, filed on Dec. 9, 2016, now Pat. No. 10,361,015.

(60) Provisional application No. 62/265,952, filed on Dec. 10, 2015.

(51) Int. Cl.
| | |
|---|---|
| *H01B 7/36* | (2006.01) |
| *H01B 9/02* | (2006.01) |
| *H02G 3/04* | (2006.01) |
| *F21V 27/02* | (2006.01) |
| *H02G 3/38* | (2006.01) |
| *H02G 3/08* | (2006.01) |

(52) U.S. Cl.
CPC ............ *H02G 3/0468* (2013.01); *F21V 27/02* (2013.01); *H02G 3/083* (2013.01); *H02G 3/381* (2013.01)

(58) Field of Classification Search
CPC . H01B 13/26; H01B 7/02; H01B 7/04; H01B 7/295; H01B 13/06; H01B 13/148; H01B 3/445; H01B 7/0045; H01B 7/0275; H01B 7/1875; H01B 7/28; H01B 7/29; H01B 1/026; H01B 11/1008; H01B 11/1066; H01B 3/004; H01B 7/1895; H01B 7/228; H01B 7/292; H01B 9/003; H01B 1/023; H01B 11/1033; H01B 11/1091; H01B 11/1808; H01B 11/20; H01B 13/00; H01B 13/14; H01B 13/22; H01B 3/307; H01B 5/08; H01B 7/0216; H01B 7/18; H01B 7/1825; H01B 7/186; H01B 7/1865; H01B 7/22; H01B 7/2806; H01B 7/423; H01B 9/02; H01B 9/027
See application file for complete search history.

(56) References Cited

U.S. PATENT DOCUMENTS

| | | | |
|---|---|---|---|
| 1,961,932 A | 6/1934 | Hyser | |
| 2,004,901 A | 6/1935 | Palmer | |
| 2,180,731 A | 11/1939 | Dickinson | |
| 2,761,893 A | 9/1956 | Morrison | |
| 3,120,575 A | 2/1964 | Hudson | |
| 3,233,032 A | 2/1966 | Crowdes | |
| 3,259,675 A | 7/1966 | Bowers | |
| 3,483,313 A | 12/1969 | Schaffhauser | |
| 3,509,269 A | 4/1970 | Elliott | |
| 4,110,554 A | 8/1978 | Moore et al. | |
| 5,418,878 A | 5/1995 | Sass et al. | |
| 5,428,187 A | 6/1995 | Crane et al. | |
| 5,777,273 A * | 7/1998 | Woody | H01B 9/003 174/116 |
| 5,956,445 A | 9/1999 | Deitz, Sr. et al. | |
| 6,114,632 A | 9/2000 | Planas, Sr. et al. | |
| 6,249,913 B1 | 6/2001 | Galipeau et al. | |
| 6,259,019 B1 | 7/2001 | Damilo et al. | |
| 6,486,395 B1 | 11/2002 | Temblador | |
| 7,038,138 B2 | 5/2006 | Laity et al. | |
| 7,208,684 B2 | 4/2007 | Fetterolf, Sr. et al. | |
| 7,880,089 B1 | 2/2011 | Herrin | |
| 8,088,997 B2 | 1/2012 | Picard et al. | |
| 8,089,001 B2 | 1/2012 | Wang | |
| 8,124,875 B2 | 2/2012 | Aitken et al. | |
| 8,581,742 B2 | 11/2013 | Viswanathan et al. | |
| 9,000,301 B2 | 4/2015 | Hayakawa et al. | |
| 9,018,529 B2 | 4/2015 | Sidlyarevich | |
| 9,368,260 B2 | 6/2016 | Varkey et al. | |
| 9,922,756 B1 | 3/2018 | Smith et al. | |
| 10,002,689 B2 | 6/2018 | Straniero et al. | |
| 10,431,353 B2 | 10/2019 | Straniero et al. | |
| 10,622,120 B2 | 4/2020 | Straniero et al. | |
| 10,847,286 B2 | 11/2020 | Straniero et al. | |
| 2003/0121694 A1 | 7/2003 | Grogl et al. | |
| 2006/0021786 A1 | 2/2006 | Fetterolf, Sr. et al. | |
| 2006/0021787 A1 | 2/2006 | Fetterolf, Sr. et al. | |
| 2007/0074891 A1 | 4/2007 | Burke | |
| 2007/0102188 A1 | 5/2007 | Glew | |
| 2008/0142244 A1 | 6/2008 | Head | |
| 2008/0277138 A1 | 11/2008 | Gallens et al. | |
| 2009/0139744 A1 | 6/2009 | Varkey et al. | |
| 2009/0250238 A1 | 10/2009 | Picard et al. | |
| 2009/0262781 A1 * | 10/2009 | Shumaker | G01K 1/08 374/170 |
| 2010/0101821 A1 | 4/2010 | Agan et al. | |
| 2010/0186987 A1 | 7/2010 | Aitken et al. | |
| 2010/0258333 A1 | 10/2010 | Horan et al. | |
| 2011/0088926 A1 | 4/2011 | Grogl et al. | |
| 2011/0278043 A1 | 11/2011 | Ueda et al. | |
| 2013/0210272 A1 | 8/2013 | Yuan et al. | |
| 2013/0264112 A1 | 10/2013 | Xu et al. | |
| 2013/0277087 A1 | 10/2013 | Hayakawa et al. | |
| 2013/0333943 A1 | 12/2013 | Tanaka et al. | |
| 2014/0064681 A1 | 3/2014 | Register, III et al. | |
| 2014/0096996 A1 | 4/2014 | Sidlyarevich | |
| 2014/0305675 A1 * | 10/2014 | Liang | H01B 11/00 174/107 |
| 2014/0378312 A1 | 12/2014 | Tamada et al. | |
| 2015/0000954 A1 | 1/2015 | Nonen et al. | |
| 2015/0023640 A1 | 1/2015 | Blazer et al. | |
| 2015/0023641 A1 | 1/2015 | Blazer et al. | |
| 2015/0075838 A1 | 3/2015 | Buck et al. | |
| 2015/0170799 A1 | 6/2015 | Varkey et al. | |
| 2015/0270028 A1 * | 9/2015 | Tsao | H01B 11/00 174/107 |
| 2018/0151271 A1 * | 5/2018 | Sidlyarevich | H02K 11/21 |

OTHER PUBLICATIONS

Underwriters Laboratories, "UL Standard for Safety for Metal Clad Cables", UL 1569, Fifth Edition, Dated May 4, 2018, 75 pages.

* cited by examiner

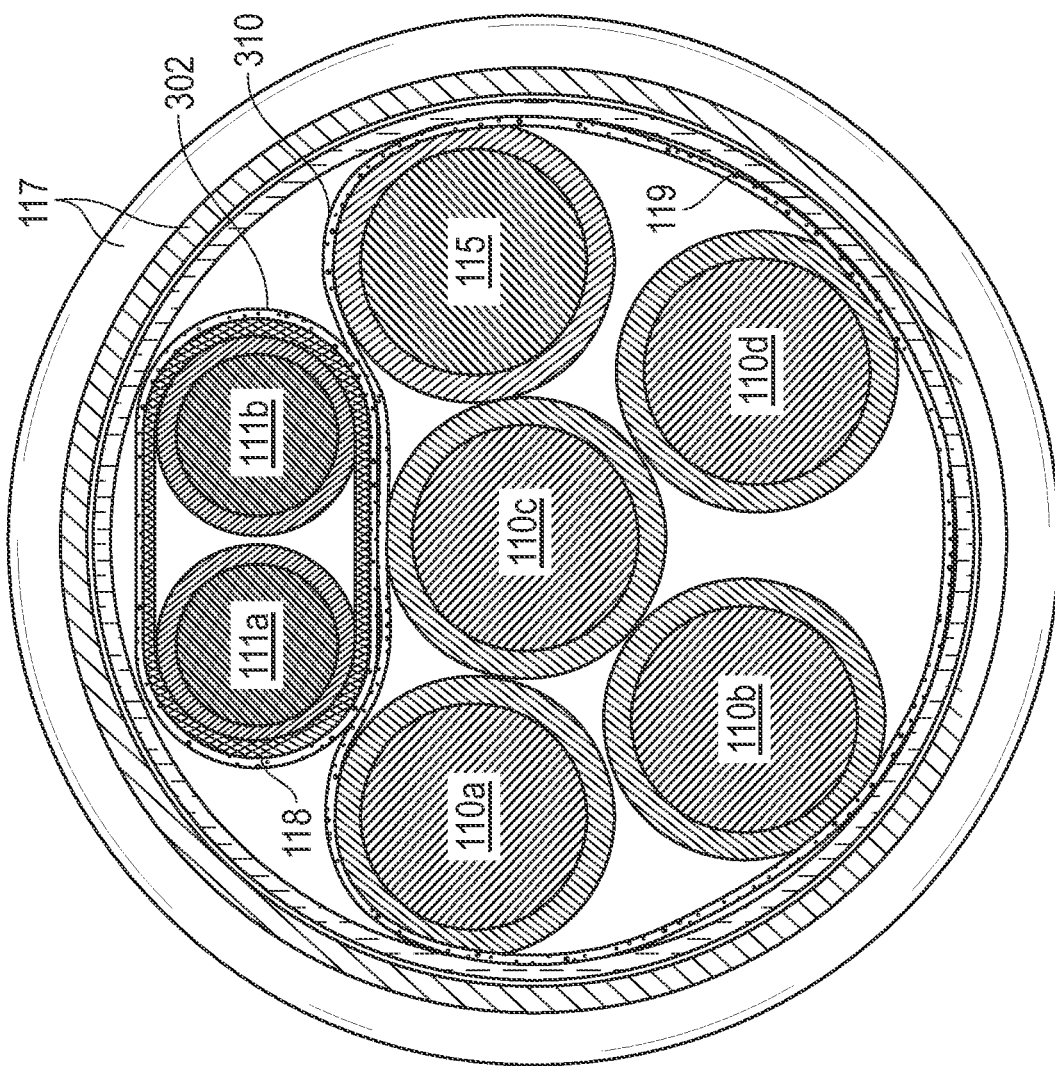

METAL-CLAD MULTI-CIRCUIT ELECTRICAL CABLE ASSEMBLY

CROSS-REFERENCE TO RELATED APPLICATIONS

This application is a continuation-in-part of U.S. patent application Ser. No. 17/135,794, filed, Dec. 28, 2020, which is a continuation of U.S. patent application Ser. No. 16/790, 307, filed, Feb. 13, 2020, which issued as U.S. Pat. No. 10,910,131 on Feb. 2, 2021, which is a continuation of U.S. patent application Ser. No. 16/443,764, filed Jun. 17, 2019, which issued as U.S. Pat. No. 10,607,752 on Mar. 31, 2020, which is a continuation of U.S. patent application Ser. No. 15/374,443, filed Dec. 9, 2016, which issued as U.S. Pat. No. 10,361,015 on Jul. 23, 2019, which claims priority benefit to U.S. Provisional Patent Application No. 62/265,952, filed Dec. 10, 2015 all of which are fully incorporated by reference herein.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

The present invention relates in general to electrical wire and cable, and more particularly, to the manufacturing and composition of multi-conductor electrical wire and cable for commercial use.

2. Description of Related Art

Due to the rapid acceptance and/or adoption of the International Energy Conservation Code (IECC) and the International Green Construction Code (IGCC), an increasing number of commercial buildings are constructed with advanced energy management systems utilizing "smart control" technology. Energy management systems and smart lighting technology permit building operators to reduce the light power density (LPD) of the building's lighting footprint in an effort to decrease over-illumination and unnecessary energy waste. In 2014 the National Electrical Code® (NEC) created Article 750 specifically to address the growing trend in energy management and smart lighting technology that maintains "smart" luminaires (lighting fixtures) as critical components of a building's overall energy use reduction program.

Smart lighting control technology reduces energy usage and cost by eliminating over-illumination, which results in unnecessary energy waste. These solutions provide centralized control of all lighting within a commercial building, thus allowing implementation of scheduling, occupancy control, daylight harvesting, and more. Many systems also support Demand Response (DR), and will automatically dim or turn off lights to take advantage of DR incentives and cost savings obtainable through the International Building Code.

Energy management technology in commercial buildings is not limited to lighting systems. "Smart" climate control systems can monitor and control localized air handling systems to maintain optimal temperatures in occupied and unoccupied spaces. Centralized management and control systems can also monitor and control security-related fixtures, such as remotely-lockable access doors, elevators, and more. These are only a few examples.

As used in this specification, the term "smart" (with or without quotation marks) used to describe a luminaire or other commercial building fixture, refers to a device or apparatus typically installed in a commercial building or structure, which device or apparatus comprises (a) a "primary" electrical power supply circuit which delivers the requisite supply voltage necessary to permit the fixture to perform its primary function (e.g., the power needed to illuminate a light fixture); and (b) one or more separate control circuit(s) through which a centralized energy management/control system may transmit operational control signals to, and/or receive sensor or status information from, such device or apparatus.

Smart fixtures that are monitored and controlled by an integrated smart system, typically require at least two separate circuits for operation: (a) A Class 1 circuit to supply the electrical power needed to operate the fixture; and (b) a Class 2 or 3 circuit to carry low-voltage control signals from the building's energy management system, which signals allow the system to control each fixture and/or receive information sent therefrom. For example, control signals to a "smart" luminaire can turn the lights on or off, dim the lighting output, etc.

The NEC and various other building and electrical codes require Class 1 supply circuits, which typically operate at 110 VAC but may operate up to 600 VAC, to be protected by a conductive raceway (such as metallic conduit), or to be installed using metal-clad (MC) electrical cable, the purpose of which is to protect the conductors within, while providing a return ground path to guard against ground fault, short-circuit, or other electrical fault. Class 2/3 control circuits, on the other hand, carry lower-voltage signals and thus may be installed using standard flexible insulated cable rated for such signals.

Traditionally, these two circuits to a given smart fixture are installed separately, using both MC and non-MC multi-conductor cable. In many instances, both cables are installed and connected to the same fixture. This requires two separate cable runs (often by two different electrical contractors at different times), resulting in duplication of labor, additional material costs, the time and expense of obtaining additional permits and inspections, etc. The resulting installation results in a bulky arrangement of two separate cables terminating at the fixture via a connector plate or access panel equipped with two or more separate connection ports.

In a typical commercial lighting installation, for example, multiple ceiling-mounted luminaires are each connected to these dual circuits. The result is a complex arrangement of cables and connectors in the ceiling spaces where such luminaires are installed.

One prior art solution is to install two separate multi-conductor cables—one rated for the Class 1 circuit, the other for the Class 2/3 circuit—together inside a single conductive raceway or conduit made of electrical metallic tubing, or EMT. Said raceway or conduit connects directly to the fixture through a single port. While this method does create a de facto multi-circuit armored pathway to the fixture, it requires the installer to first install the conduit itself, then pull two separate cables through the conduit. The method thus achieves space savings and results in a well-protected and more aesthetically pleasing installation; but it requires considerable additional time, labor, and materials, as well as the increased costs associated therewith.

Therefore, a need exists for a single, integrated multi-circuit electrical cable assembly which can carry both a properly-armored Class 1 circuit (to supply operating power) and a Class 2/3 circuit (to carry control signals) to each fixture, without the requirement of installing separate circuit cabling.

BRIEF SUMMARY OF THE INVENTION

One embodiment of the invention provides for an integrated, multi-circuit electrical cable assembly. The cable assembly comprises at least one Class 1-rated electrical circuit and at least one Class 2/3-rated electrical circuit, longitudinally disposed to one another. The Class 2/3-rated circuit is isolated from the Class 1-rated circuit by both an insulating jacketing or sheathing and an additional wrap of material surrounding the insulating jacket or sheath. The entire assembly is encased within a flexible, conductive metallic armor which forms an electrically conductive return ground path to protect against ground fault, short-circuit or other electrical fault.

One embodiment of the invention also provides a method for manufacturing a metal-clad multi-circuit electrical cable assembly. The method comprises placing a plurality of multi-conductor electrical circuits together in longitudinal disposition to one another, thus forming a multi-circuit assembly, wrapping the assembly with a nonconductive separator tape, and placing a flexible, interlocked conductive metal sheath around the wrapped assembly such that the metal sheath encases the wrapped multi-circuit cable assembly and forms a conductive return electrical ground path.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown.

FIG. 24 is an end view of a metal-clad multi-circuit electrical cable in accordance with one embodiment of the invention.

DETAILED DESCRIPTION OF THE PREFERRED EMBODIMENT

The following discussion is presented to enable a person skilled in the art to make and use the present invention. The general principles described herein may be applied to embodiments and applications other than those specifically detailed below without departing from the spirit and scope of the present invention. Therefore, the present invention is not intended to be limited to the embodiments expressly shown, but is to be accorded the widest possible scope of invention consistent with the principles and features disclosed herein.

Figure 1:
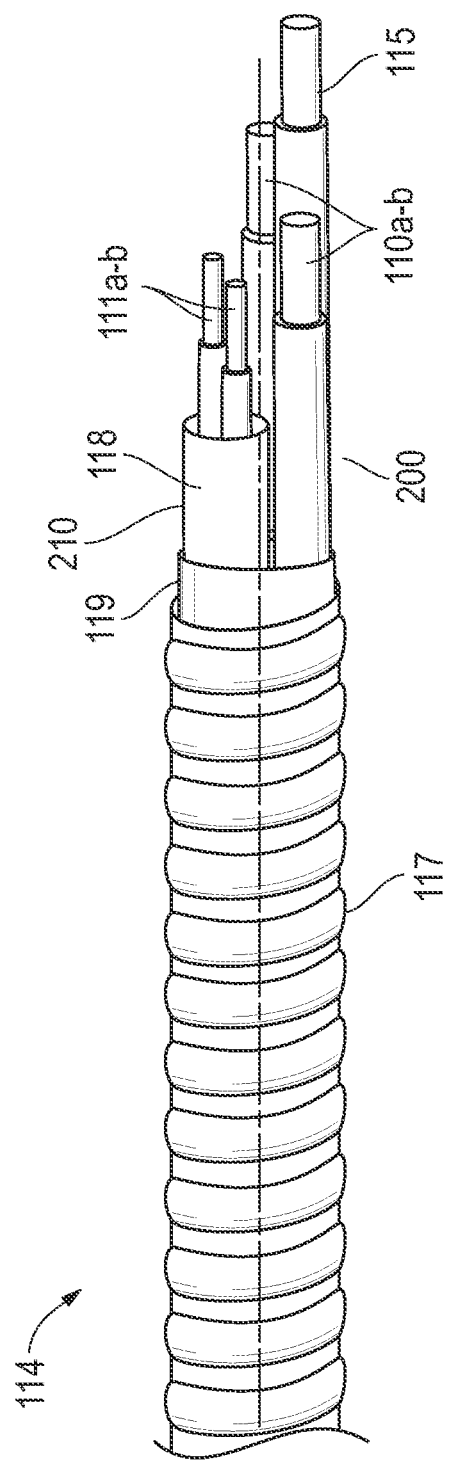
FIG. 1 is a partial cutaway perspective view of a metal-clad multi-circuit electrical cable assembly in accordance with one embodiment of the invention.
Figure 2:
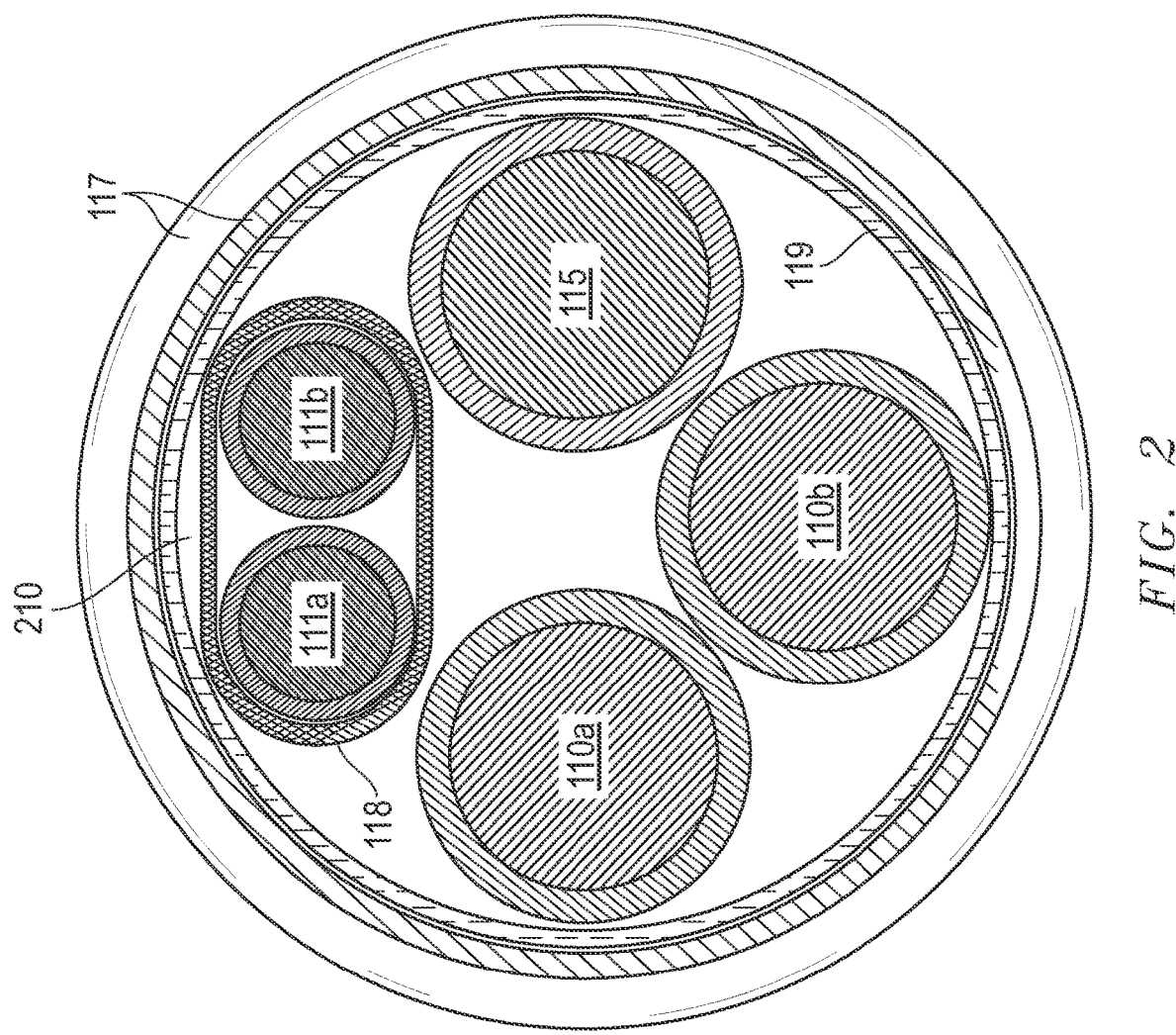
FIG. 2 is an end view of a metal-clad multi-circuit electrical cable assembly in accordance with one embodiment of the invention.

FIGS. 1-2 show a metal-clad multi-circuit electrical cable assembly according to one embodiment of the invention. FIG. 1 shows one embodiment in partial cutaway perspective, allowing identification of all elements of the assembly. FIG. 2 shows the embodiment in an end view.

In one embodiment, the metal-clad multi-circuit cable assembly 114 is shown. The metal-clad multi-circuit assembly 114 includes a total of five (5) conductors designed to carry two discrete circuits: (a) a Class 1-rated single-phase AC circuit 200; and (b) a Class 2/3-rated low-voltage circuit 210. However, wide variations in the quantity, type, and size of conductors used within such a multi-circuit cable assembly (as well as variations in the quantity, type, size, and rating of discrete circuits used therein) are contemplated without detracting from the spirit of the invention to supply multiple circuits of various types to a given type of smart fixture using an integrated cable assembly.

In one embodiment, the Class 1-rated circuit 200 includes three conductors: Two Class 1-rated insulated phase conductors 110a-b, together with a Class 1-rated insulated ground conductor 115. All three conductors 110a-b and 115 are cabled together longitudinally into a bundle, which bundle is laid using a longitudinal left- or right-handed lay, in accordance with the lay requirements defined in Underwriters' Laboratories (UL) Standard 1569, Standard for Metal-Clad Cables (hereinafter "UL 1569"), which provides construction guidelines and performance standards for metal-clad cables. In one embodiment, the phase conductors 110 and the ground conductor 115 are NEC type THHN (thermoplastic high heat-resistant Nylon-coated) conductors, rated for operation at temperatures up to 90° C. In this embodiment, the insulated ground conductor 115 is formed of solid copper, size 10 or 12 AWG, while the phase conductors 110 may be formed of solid copper (size 10 or 12 AWG), or stranded copper (size 12 AWG).

In another embodiment the Class 1-rated phase conductors 110 and the ground conductor 115 are NEC type THWN-2 (thermoplastic heat and moisture resistant Nylon-coated, type 2), rated for operation in wet locations at temperatures up to 90° C. In this embodiment, the insulated ground conductor 115 is formed of solid copper, size 10 or 12 AWG. The Class-1 rated conductors 110 may be formed of solid copper (size 10 or 12 AWG), or stranded copper (size 12 AWG).

The Class 2/3 circuit 210 of one embodiment includes of two insulated conductors, 111a-b. In one embodiment, the two insulated conductors 111a-b are NEC type TFN (thermoplastic flexible Nylon-coated), and are formed of solid copper, size 16 AWG. The Class 2/3 conductors 111a-b are cabled together longitudinally into a tightly-twisted helical ("twisted pair") arrangement, which helps minimize the impact of electromagnetic interference on signals carried within the Class 2/3 circuit 210. This twisted pair of conductors 111a-b is isolated from the conductors of the Class 1 circuit 200 by a nonconductive insulating jacket 118 which encases conductors 111a-b, thus isolating the Class 2/3 circuit 210 from the Class 1 circuit 200. In one embodiment, the insulating jacket 118 is formed from polyvinyl chloride (PVC).

In one embodiment, the insulated phase conductors 110, the insulated ground conductor 115, and the insulated conductors 111, each include an insulating material encasing the wire and a wire jacket encasing the insulated material and the wire including, but not limited to, a polyvinyl chloride (PVC) insulating material and a Nylon® jacket material. This is irrespective of the number of each conductor present in the Class 1 circuit 200 and Class 2/3 circuit 210. Each conductor may be formed from different insulating and jacketing materials.

In one embodiment, the Class 2/3 circuit 210 and the Class 1 circuit 200 are wrapped in separator tape 119, which is printed with appropriate conductor identification information, to form a single cable assembly. The wrapped assembly is then clad in a conductive armor 117 of aluminum or galvanized steel. The conductive armor sheath 117 is formed from a continuous metal strip or tape, which is formed by winding a said metallic strip helically about the wrapped conductor assembly to form the flexible interlocked sheath 117 as shown. In one embodiment, the conductive armor 117 is formed of aluminum.

The conductive armor sheath 117 is a tubular sheath formed from a continuous metal strip, which is formed into helical convolutions having a cross-sectional shape which provides for overlap and interlocking of adjacent convolutions and contact between adjacent convolutions along a helical line such that, upon bending the sheath, the convolutions remain in contact at a trailing edge of one convolution and the inner surface of an adjacent convolution. The conductive armor sheath 117 may be formed with the maximum number of convolutions within a given unit length of sheath, which decreases the minimum bending radius thereof (thus increasing sheath flexibility).

Figure 3A:
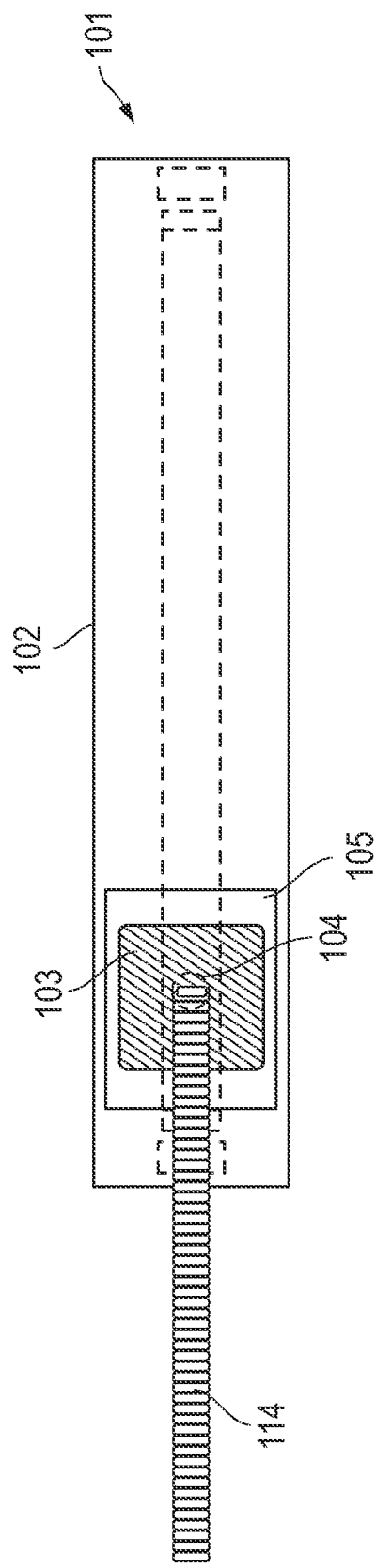
FIGS. 3A and 3B are top and side views, respectively, of an installation of a metal-clad multi-circuit electrical cable to a "smart" lighting fixture in accordance with one embodiment of the invention.
Figure 3B:
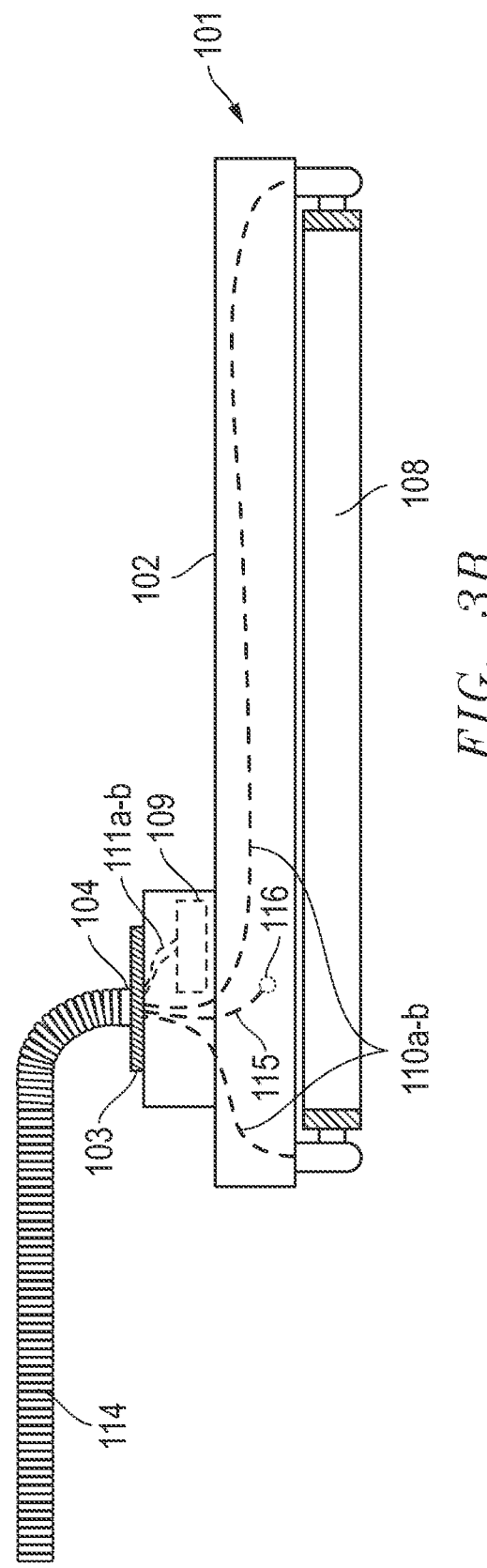

Referring now to FIGS. 3A and 3B, one embodiment of a wiring installation of a "smart" luminaire (light fixture) is shown in top and side views. A smart light fixture 101 is shown. The smart light fixture 101 includes a fixture housing 102, a control housing 105, a fixture control system 109, and a lamp element 108. The metal-clad, multi-circuit electrical cable assembly 114 carries the Class 1 circuit 200 and the Class 2/3 circuit 210 of one embodiment to the fixture housing 102. An access plate 103, which features one or more knockout-style wiring ports 104, allows an installer to access wiring connections within the fixture's control housing 105. When the conductive armor sheath 117 of the metal-clad, multi-circuit electrical cable assembly 114 is attached to the fixture housing 102 at wiring port 104, a conductive return ground path from the fixture housing 102 to the building ground is formed to guard against ground fault, short-circuit, or other electrical fault.

The conductors 110a-b and 115 of the Class 1 circuit 200 pass through wiring port 104 and control housing 105 into the fixture housing 102, where phase conductors 110a-b connect to the lamp element 108, while the ground conductor 115 connects to a fixture grounding connection 116. The conductors 111a-b of the Class 2/3 circuit 210 pass through the wiring port 104 into control housing 105, where they connect to fixture control system 109. The conductors 111a-b and the control housing 105 may carry signals, including low power signals, which control the intensity of the lamp element 108. In this manner, the desired result of carrying both a properly-armored, Class 1-rated primary power supply circuit 200 and a Class 2/3-rated control/signal circuit 210 to smart fixture 101 is achieved in a single integrated cable assembly 114.

Figure 4:
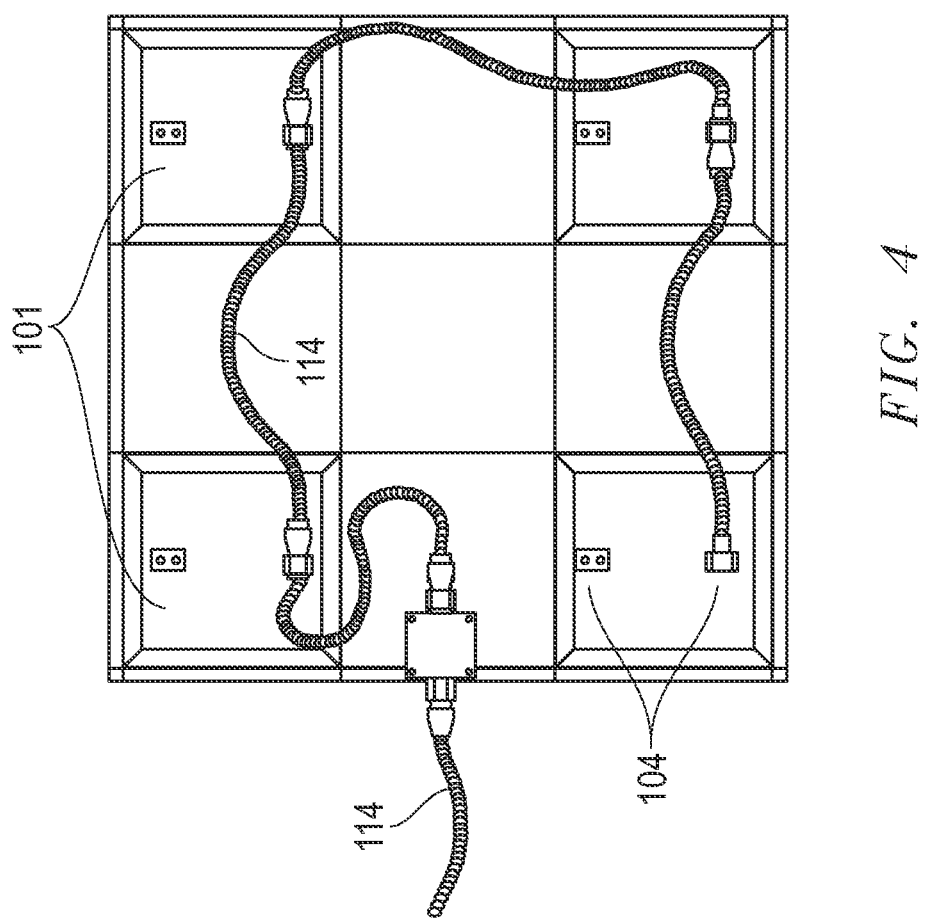
FIG. 4 is a top view of a commercial ceiling installation of "smart" lighting fixtures using the metal-clad multi-circuit electrical cable in accordance with one embodiment of the invention.

Referring to FIG. 4, an exemplary ceiling installation of light fixtures in a commercial building is shown. Multiple light fixtures 101 are arranged as desired within the ceiling structure. The fixtures are serially connected using a single run of the metal-clad multi-circuit cable assembly 114 according to one embodiment of the invention. Implementation of the metal-clad multi-circuit cable assembly 114 reduces installation of electrical cabling to a single step, which saves costs for labor and materials. The resulting installation is simplified (over the several-cables-per-fixture method of the prior art), is space-saving, and is more aesthetically pleasing than a potential tangle of multiple cables in the ceiling spaces.

Figure 5:
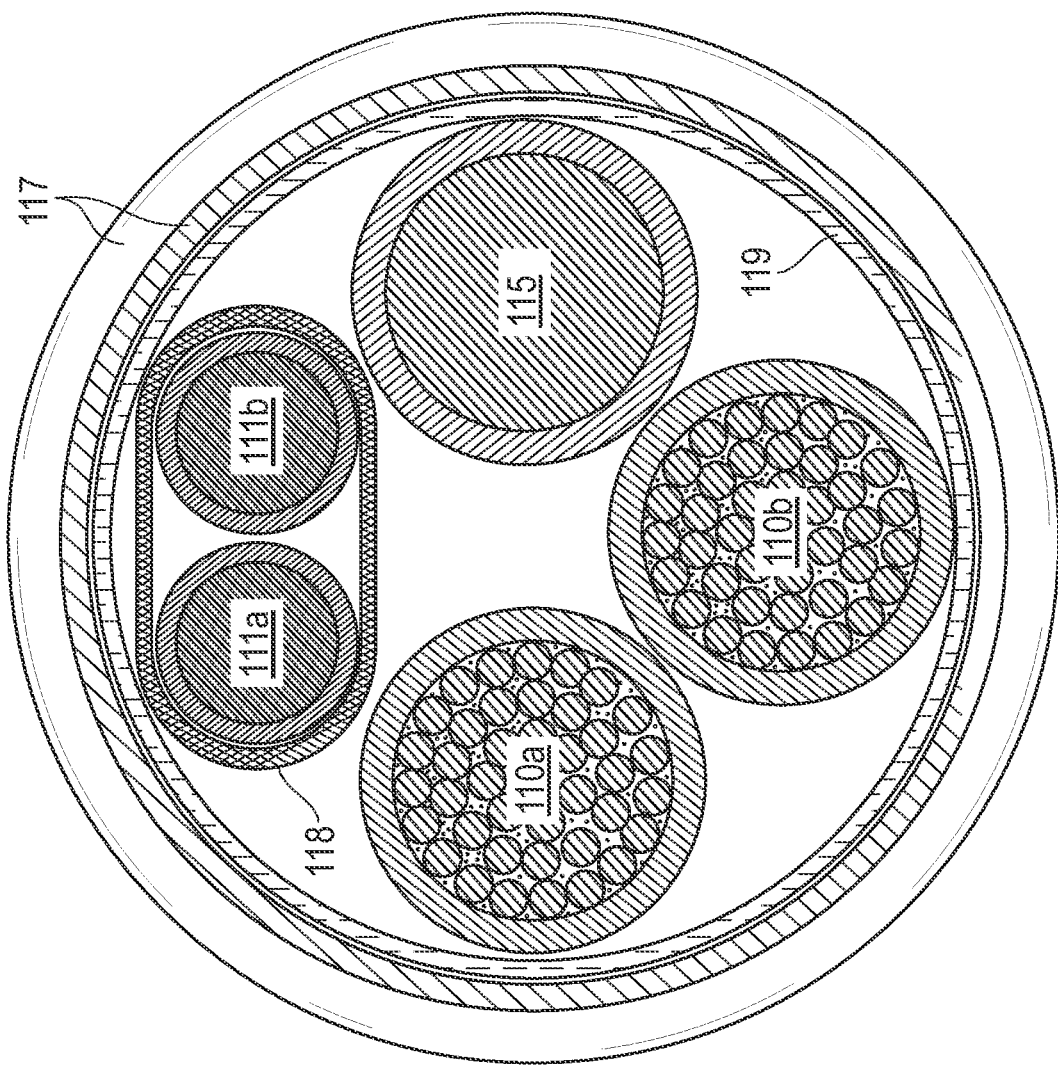
FIG. 5 is an end view of a metal-clad multi-circuit electrical cable in accordance with one embodiment of the invention.
Figure 6:
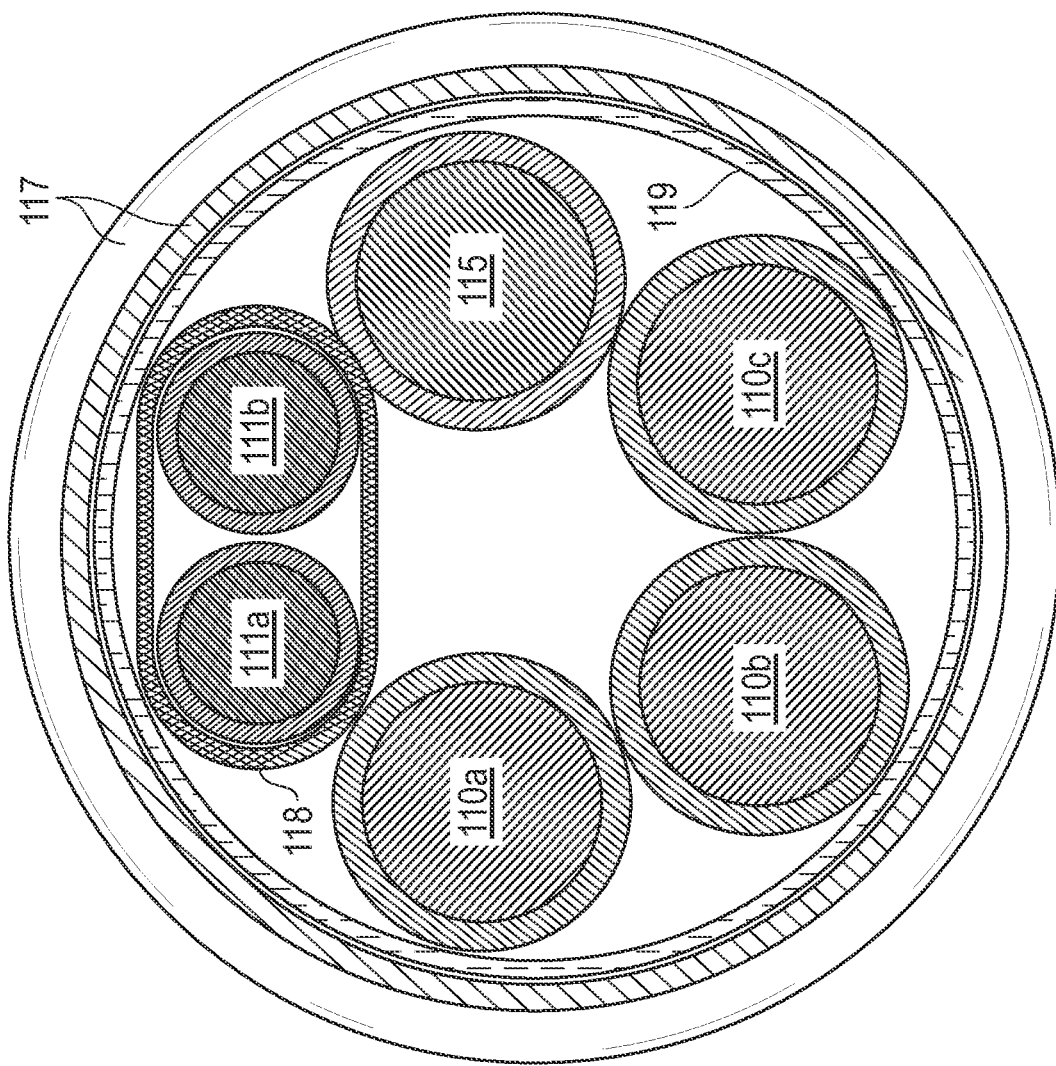
FIG. 6 is an end view of a metal-clad multi-circuit electrical cable in accordance with one embodiment of the invention.
Figure 7:
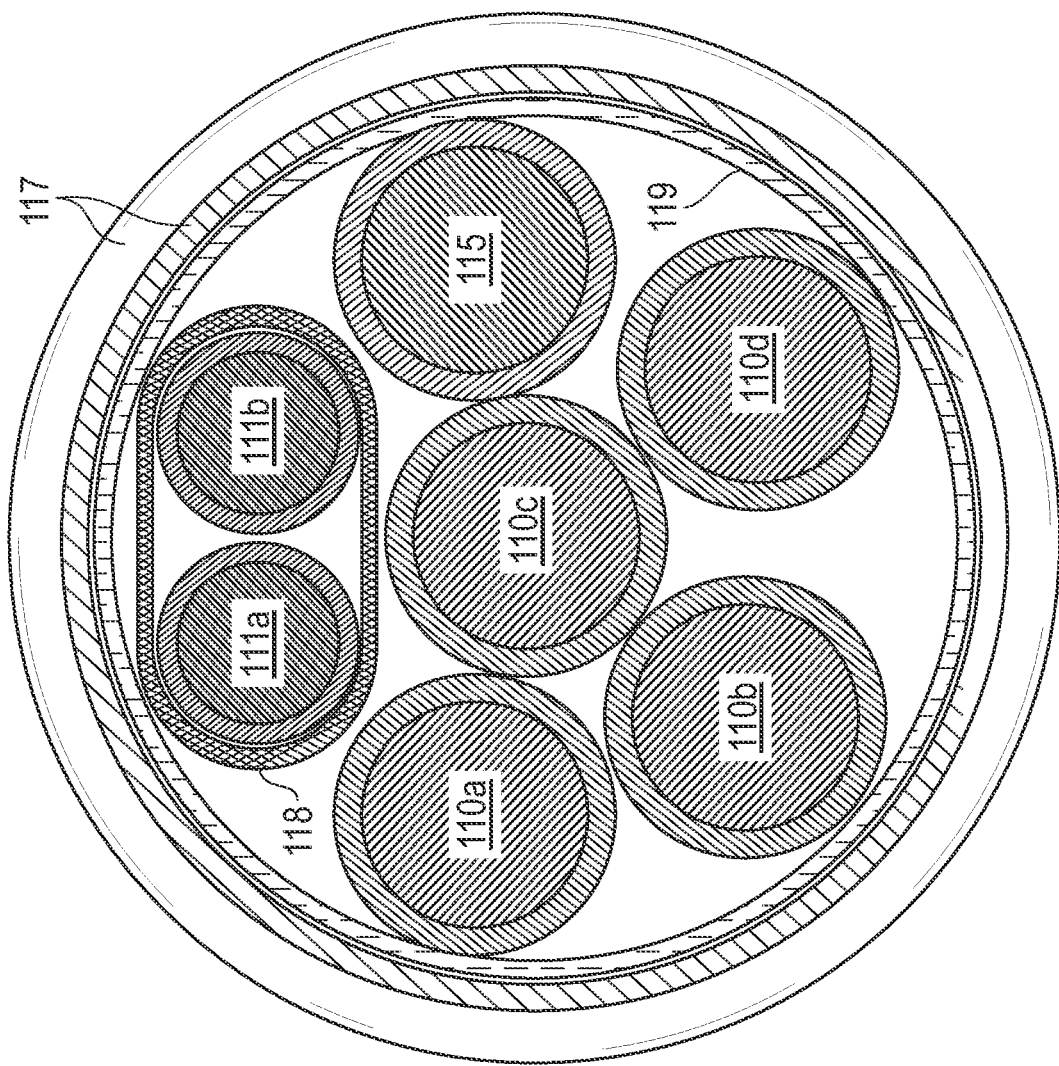
FIG. 7 is an end view of a metal-clad multi-circuit electrical cable in accordance with one embodiment of the invention.

Turning now to FIGS. 5-7, alternate embodiments of the invention are shown in end view. FIG. 5 is an end view of one embodiment of the invention in which the insulated phase conductors 110*a-b* are formed of stranded copper.

FIG. 6 is an end view of one embodiment of the invention in which the Class 1 circuit 200 includes three insulated phase conductors 110*a-c* as well as the insulated ground conductor 115. This four-conductor Class 1-rated circuit 200 may carrying dual- or split-phase AC power.

FIG. 7 is an end view of one embodiment of the invention in which the Class 1 circuit 200 includes four insulated phase conductors 110*a-d* as well as the insulated ground conductor 115. This five-conductor Class 1-rated circuit 200 may carrying three-phase AC power.

Figure 8:
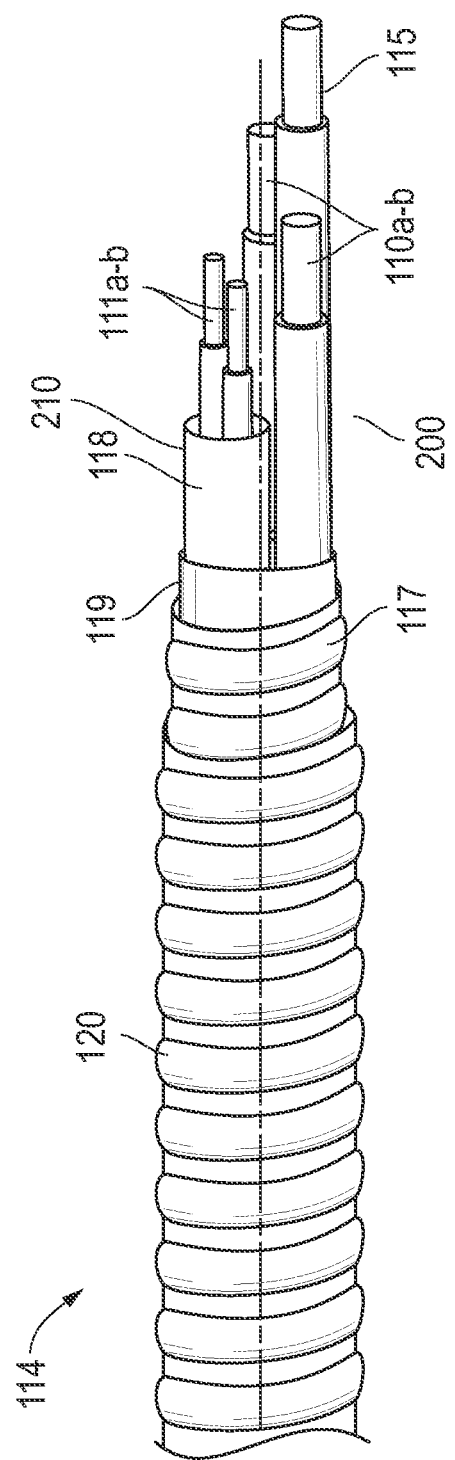
FIG. 8 is a partial cutaway perspective view of a metal-clad multi-circuit electrical cable assembly in accordance with one embodiment of the invention.
Figure 9:
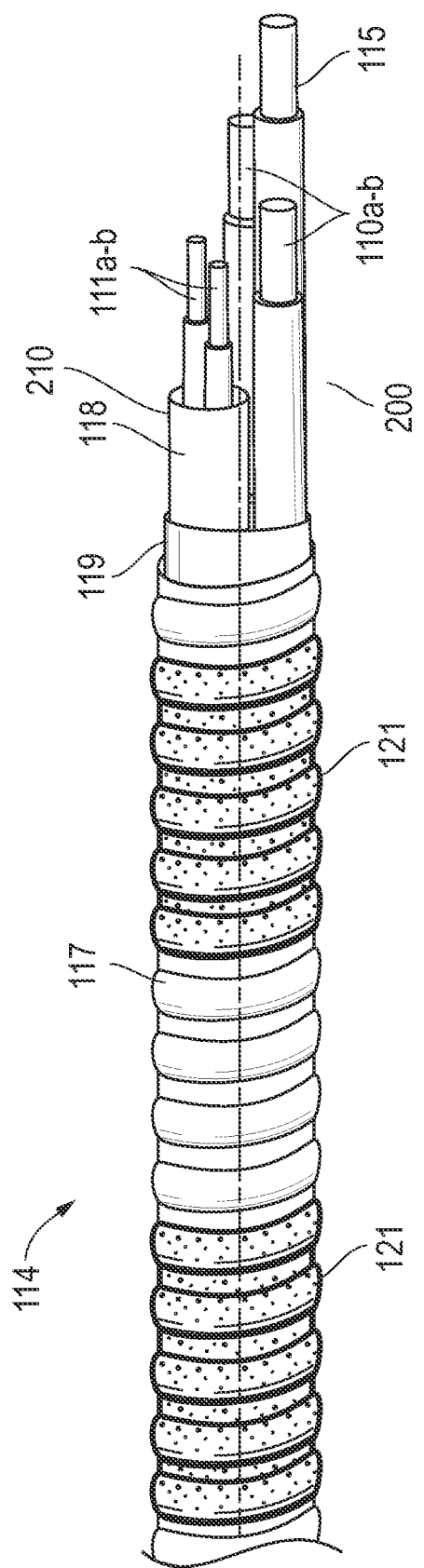
FIG. 9 is a partial cutaway perspective view of a metal-clad multi-circuit electrical cable assembly in accordance with one embodiment of the invention.

Referring to FIGS. 8-9, alternate embodiments of the invention are shown in partial cutaway perspective views. FIG. 8 shows one embodiment of the invention in which the conductive armor sheath 117 is coated with a protective jacket of polyvinyl chloride (PVC) 120, making the assembly suitable for installation in wet locations. The embodiment of the invention as shown in FIG. 8 is combinable with the embodiments of the inventions as set forth in FIGS. 1, 2, 5-7, and 10-24 and is not reliant upon the specific embodiments of the Class 1 circuit 200 or the Class 2/3 circuit 210.

FIG. 9 shows one embodiment of the invention in which removable color-coded identification labels 121 are applied to the conductive armor sheath 117, spaced at regular linear intervals, to allow for the identification of the type and application of the cable assembly contained therein without the need for disconnecting the cable assembly 114 or cutting through the conductive armor sheath 117. The embodiment of the invention as shown in FIG. 9 is combinable with the embodiments of the inventions as set forth in FIGS. 1, 2, 5-7, and 10-24 and is not reliant upon the specific embodiments of the Class 1 circuit 200 or the Class 2/3 circuit 210.

Figure 10:
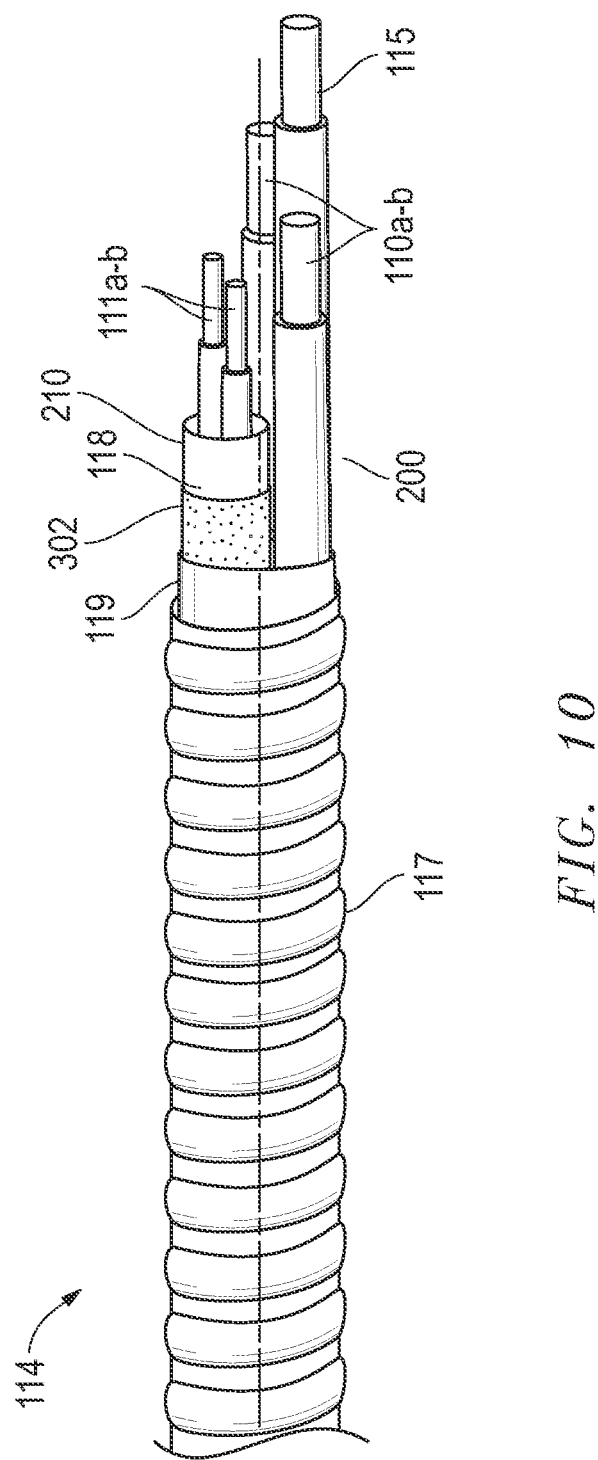
FIG. 10 is a partial cutaway perspective view of a metal-clad multi-circuit electrical cable assembly in accordance with one embodiment of the invention.
Figure 11:
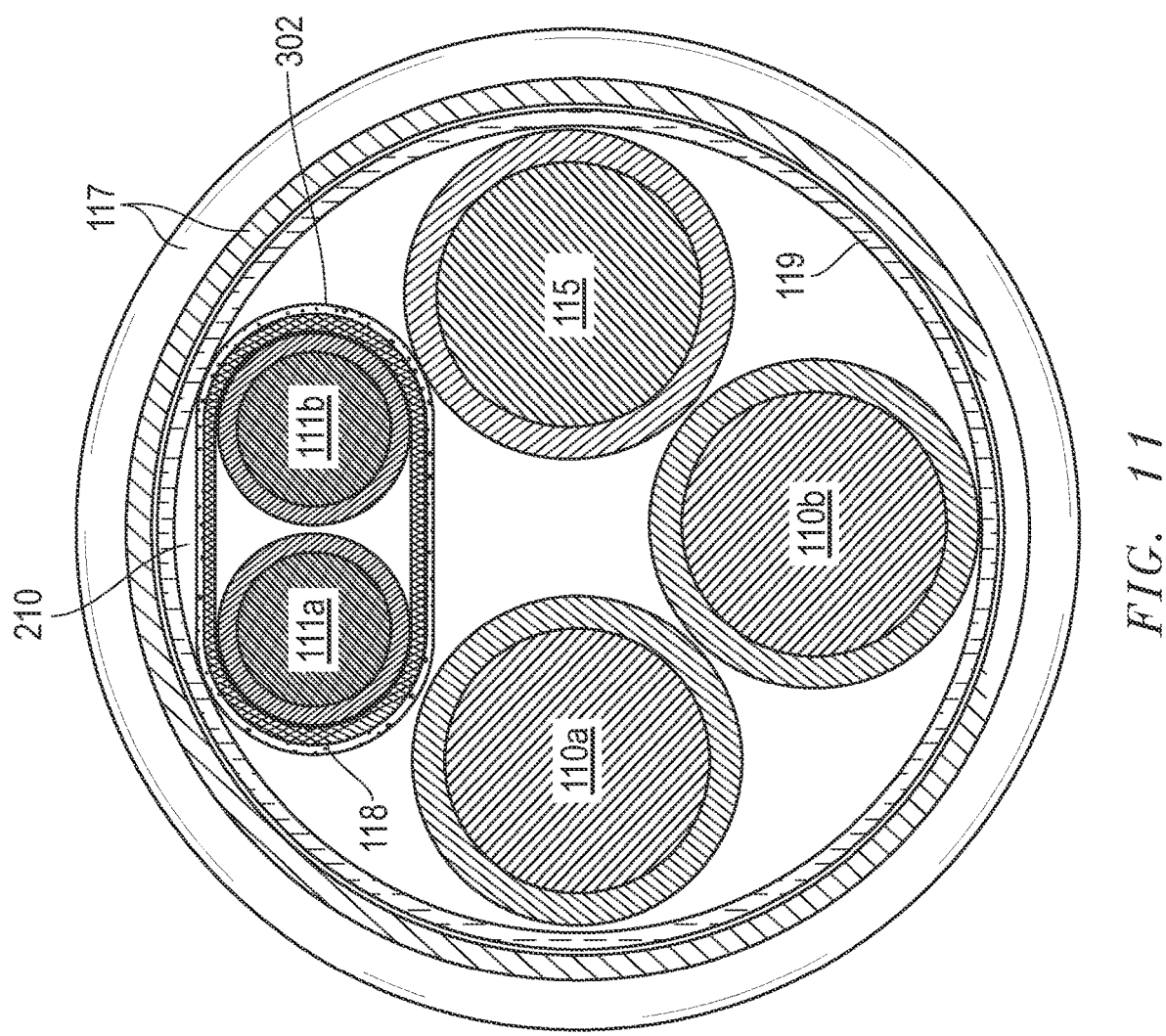
FIG. 11 is an end view of a metal-clad multi-circuit electrical cable assembly in accordance with one embodiment of the invention.

Referring to FIGS. 10 and 11, an alternate embodiment of the invention shown in a partial cutaway perspective view and an end view of a metal-clad multi-circuit electrical cable assembly. FIGS. 10 and 11 show one embodiment of the invention in which the Class 2/3 circuit 210 includes a wrap 302 encasing the nonconductive insulating jacket 118 which encases conductors 111*a-b*. The wrap 302 acts as an additional barrier between the conductors 111*a-b* and the insulated phase conductors 110*a-b* as well as the insulated ground conductor 115. The wrap 302 may be formed from a variety of materials, including, but not limited to, polyvinyl chloride (PVC), Mylar®, or plastic. Additionally, the wrap 302 may take the form of a variety of application styles, including, but not limited to, tape, separator tape, and shield. Assembly of the wrap 302 may be applied helically or longitudinally around the insulating jacket 118 without detracting from the spirit of the invention.

Figure 12:
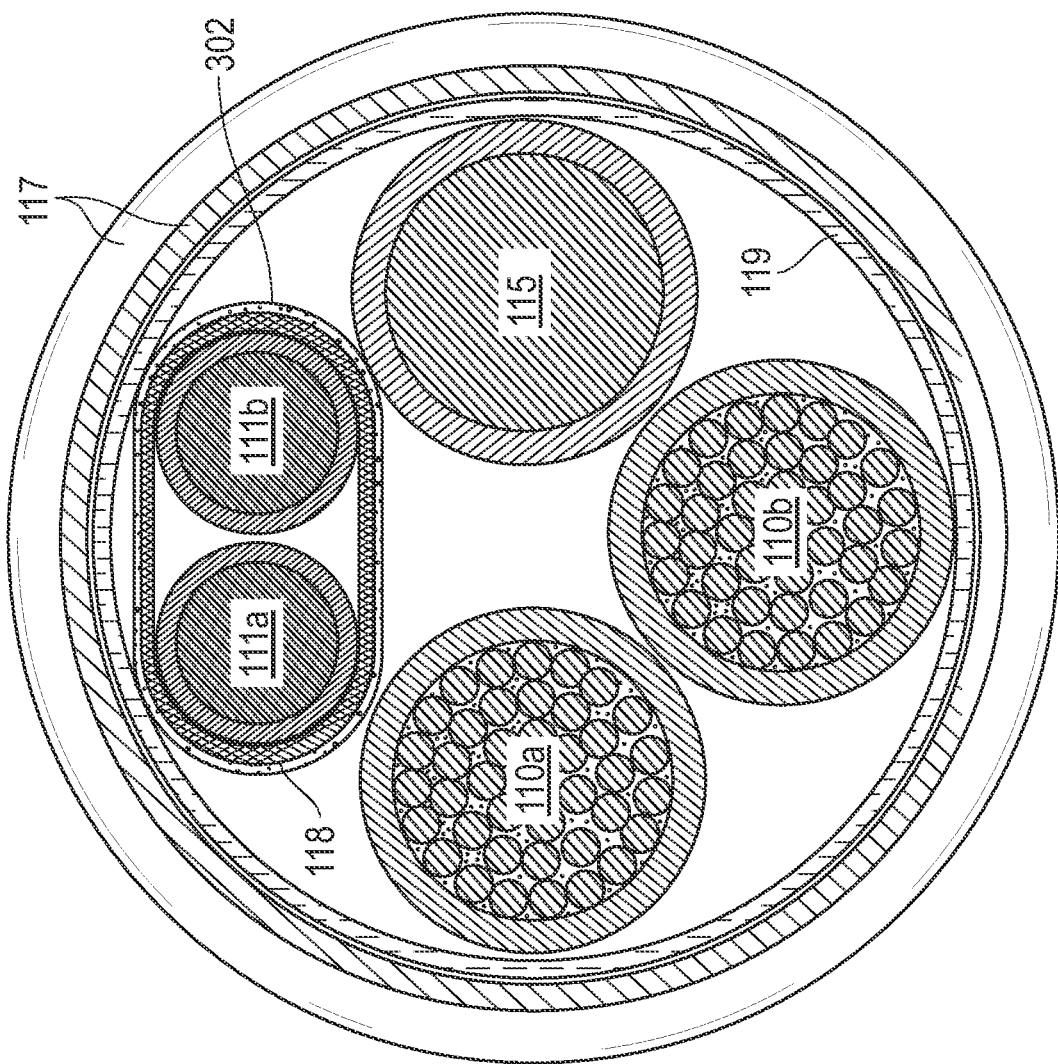
FIG. 12 is an end view of a metal-clad multi-circuit electrical cable in accordance with one embodiment of the invention.

FIG. 12 is an end view of one embodiment of the invention in which the insulated phase conductors 110*a-b* are formed of stranded copper and in which the Class 2/3 circuit 210 includes a wrap 302 encasing the nonconductive insulating jacket 118 which encases conductors 111*a-b*.

Figure 13:
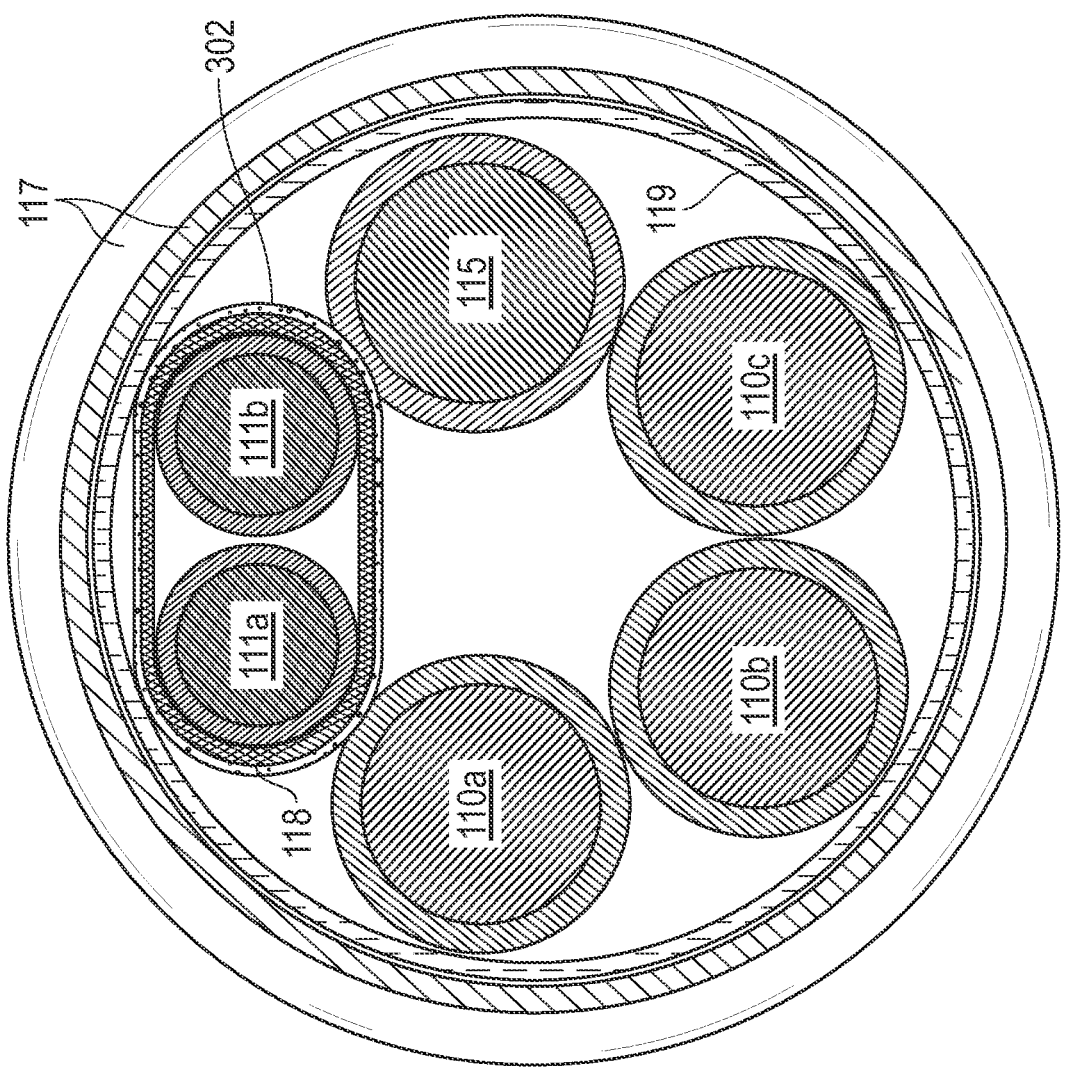
FIG. 13 is an end view of a metal-clad multi-circuit electrical cable in accordance with one embodiment of the invention.

FIG. 13 is an end view of one embodiment of the invention in which the Class 1 circuit 200 includes three insulated phase conductors 110*a-c* as well as the insulated ground conductor 115 and in which the Class 2/3 circuit 210 includes a wrap 302 encasing the nonconductive insulating jacket 118 which encases conductors 111*a-b*. This four-conductor Class 1-rated circuit 200 may carrying dual- or split-phase AC power.

Figure 14:
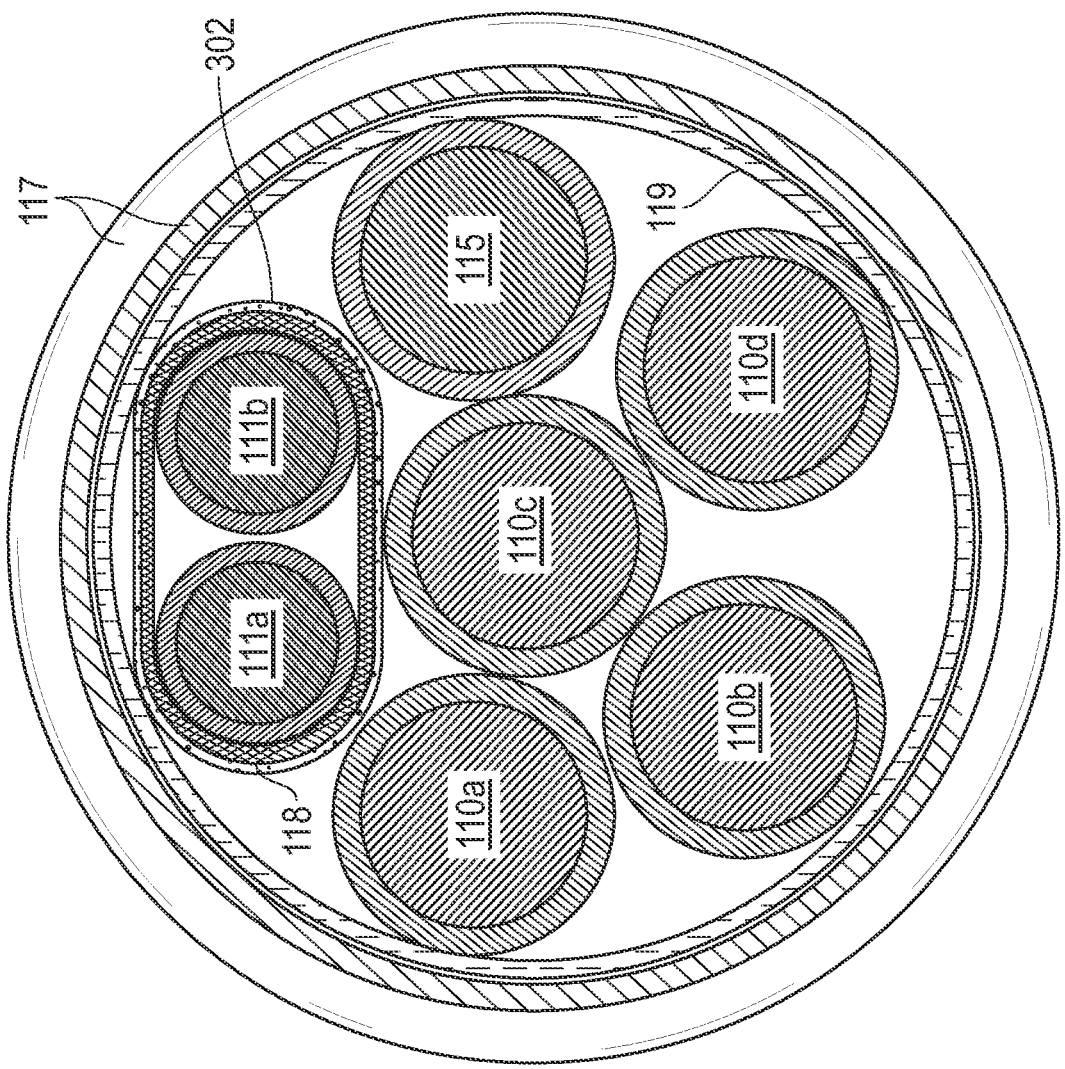
FIG. 14 is an end view of a metal-clad multi-circuit electrical cable in accordance with one embodiment of the invention.

FIG. 14 is an end view of one embodiment of the invention in which the Class 1 circuit 200 includes four insulated phase conductors 110*a-d* as well as the insulated ground conductor 115 and in which the Class 2/3 circuit 210 includes a wrap 302 encasing the nonconductive insulating jacket 118 which encases conductors 111*a-b*. This five-conductor Class 1-rated circuit 200 may carrying three-phase AC power.

Figure 15:
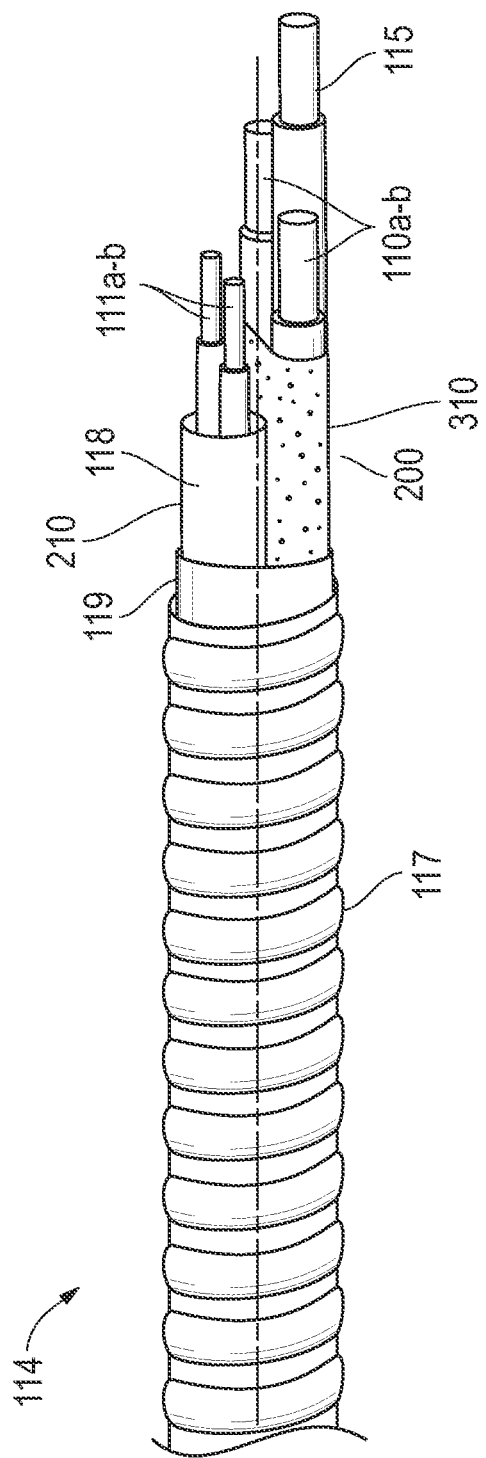
FIG. 15 is a partial cutaway perspective view of a metal-clad multi-circuit electrical cable assembly in accordance with one embodiment of the invention.
Figure 16:
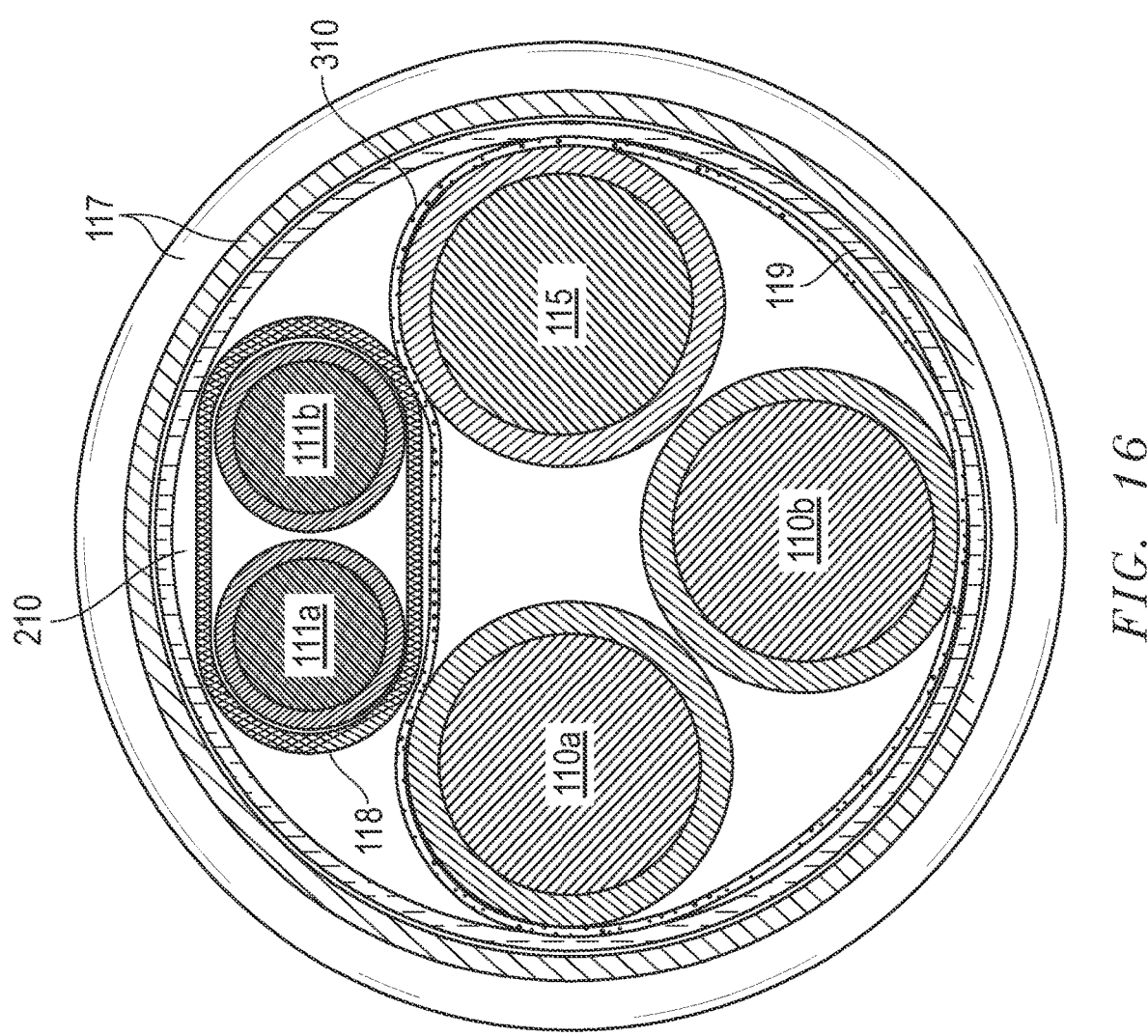
FIG. 16 is an end view of a metal-clad multi-circuit electrical cable assembly in accordance with one embodiment of the invention.

Referring to FIGS. 15 and 16, an alternate embodiment of the invention shown in a partial cutaway perspective view and an end view of a metal-clad multi-circuit electrical cable assembly. FIGS. 15 and 16 show one embodiment of the invention in which the Class 1 circuit 200 includes a wrap 310 encasing the insulated phase conductors 110*a-b* as well as the insulated ground conductor 115. The wrap 310 acts as an additional barrier between the conductors 111*a-b* and the insulated phase conductors 110*a-b* as well as the insulated ground conductor 115. The wrap 310 may be formed from a variety of materials, including, but not limited to, polyvinyl chloride (PVC), Mylar®, or plastic. Additionally, the wrap 310 may take the form of a variety of application styles, including, but not limited to, tape, separator tape, and shield. Assembly of the wrap 310 may be applied helically or longitudinally around the insulated phase conductors 110*a-b* as well as the insulated ground conductor 115 without detracting from the spirit of the invention.

Figure 17:
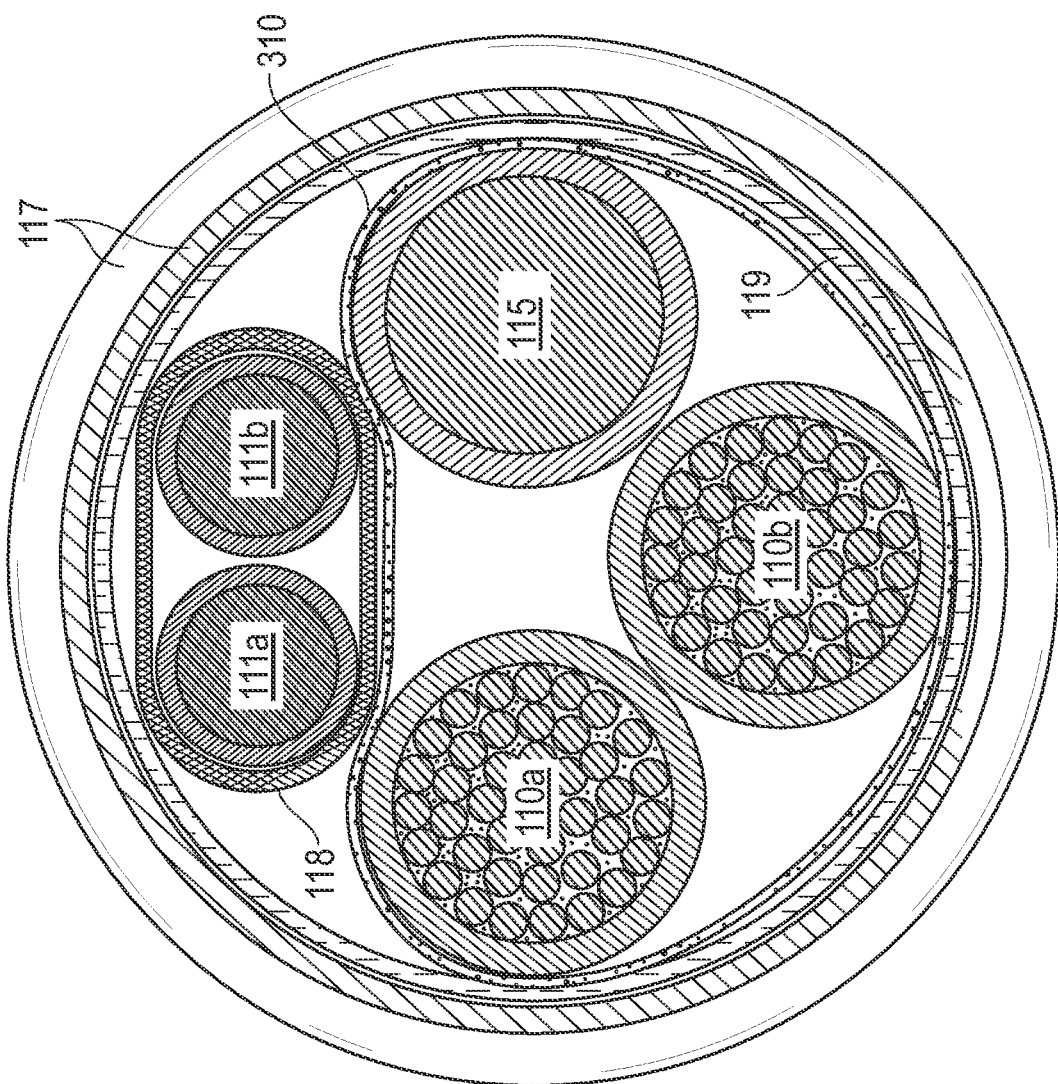
FIG. 17 is an end view of a metal-clad multi-circuit electrical cable in accordance with one embodiment of the invention.

FIG. 17 is an end view of one embodiment of the invention in which the insulated phase conductors 110*a-b* are formed of stranded copper and in which the Class 1 circuit 200 includes a wrap 310 encasing the insulated phase conductors 110*a-b* as well as the insulated ground conductor 115.

Figure 18:
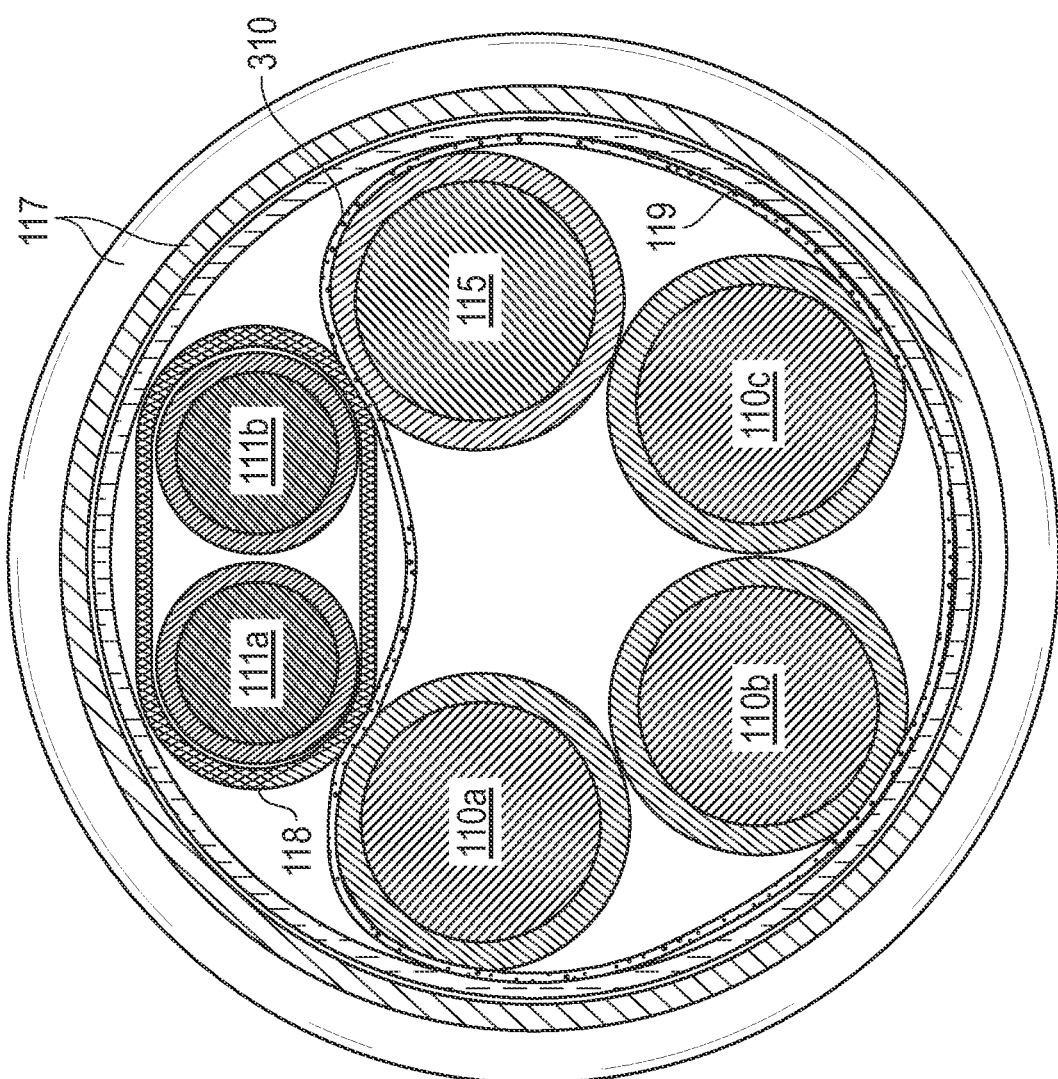
FIG. 18 is an end view of a metal-clad multi-circuit electrical cable in accordance with one embodiment of the invention.

FIG. 18 is an end view of one embodiment of the invention in which the Class 1 circuit 200 includes three insulated phase conductors 110*a-c* as well as the insulated ground conductor 115 and in which the Class 1 circuit 200 includes a wrap 310 encasing the three insulated phase conductors 110*a-c* as well as the insulated ground conductor 115. This four-conductor Class 1-rated circuit 200 may carrying dual- or split-phase AC power.

Figure 19:
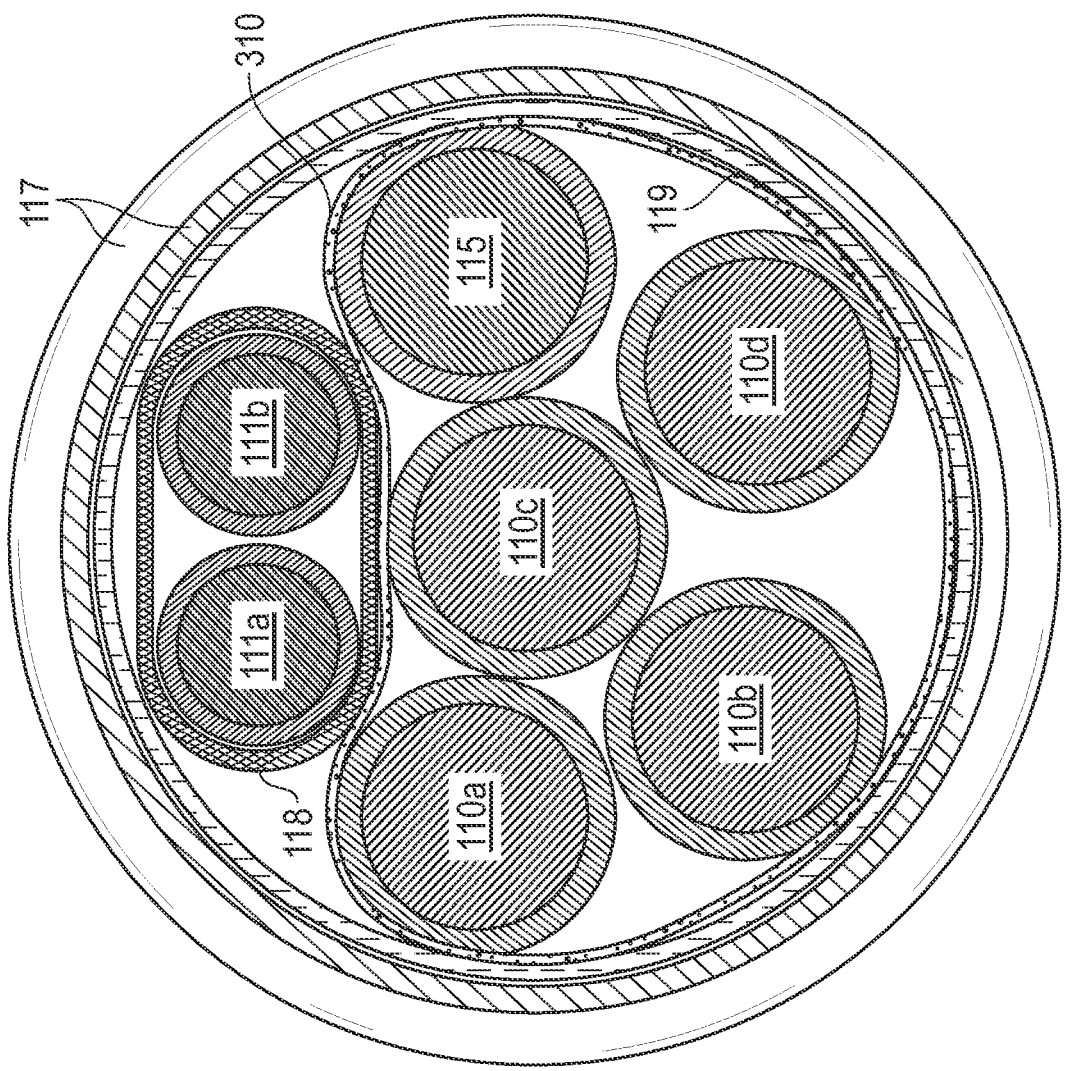
FIG. 19 is an end view of a metal-clad multi-circuit electrical cable in accordance with one embodiment of the invention.

FIG. 19 is an end view of one embodiment of the invention in which the Class 1 circuit 200 includes four insulated phase conductors 110*a-d* as well as the insulated ground conductor 115 and the Class 1 circuit 200 includes a wrap 310 encasing the four insulated phase conductors 110*a-d* as well as the insulated ground conductor 115. This five-conductor Class 1-rated circuit 200 may carrying three-phase AC power.

Figure 20:
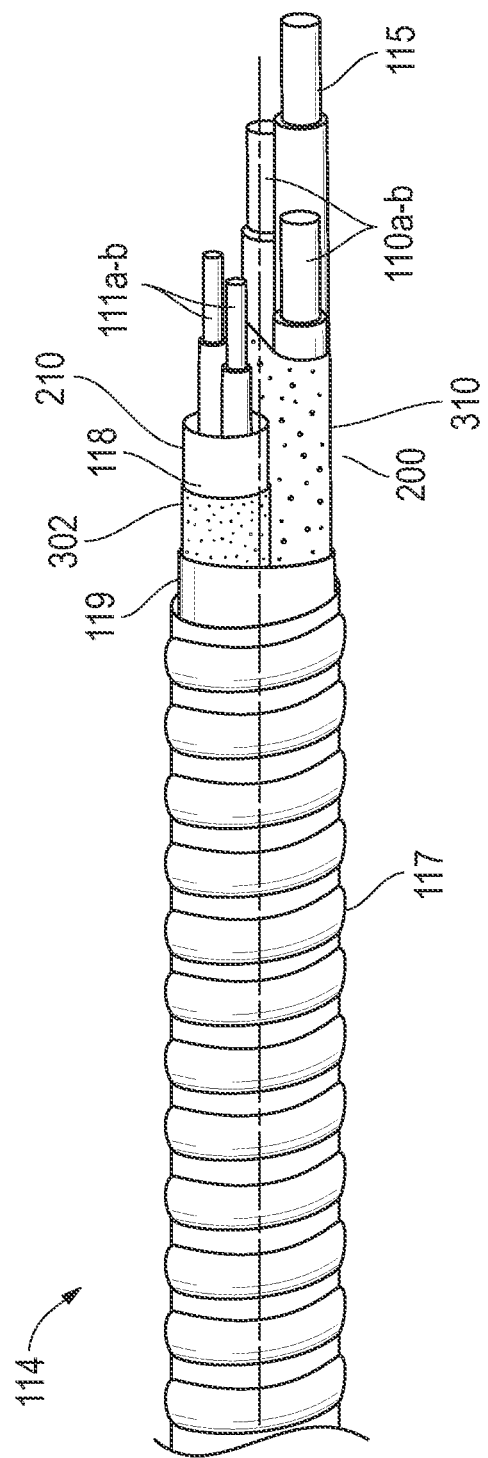
FIG. 20 is a partial cutaway perspective view of a metal-clad multi-circuit electrical cable assembly in accordance with one embodiment of the invention.
Figure 21:
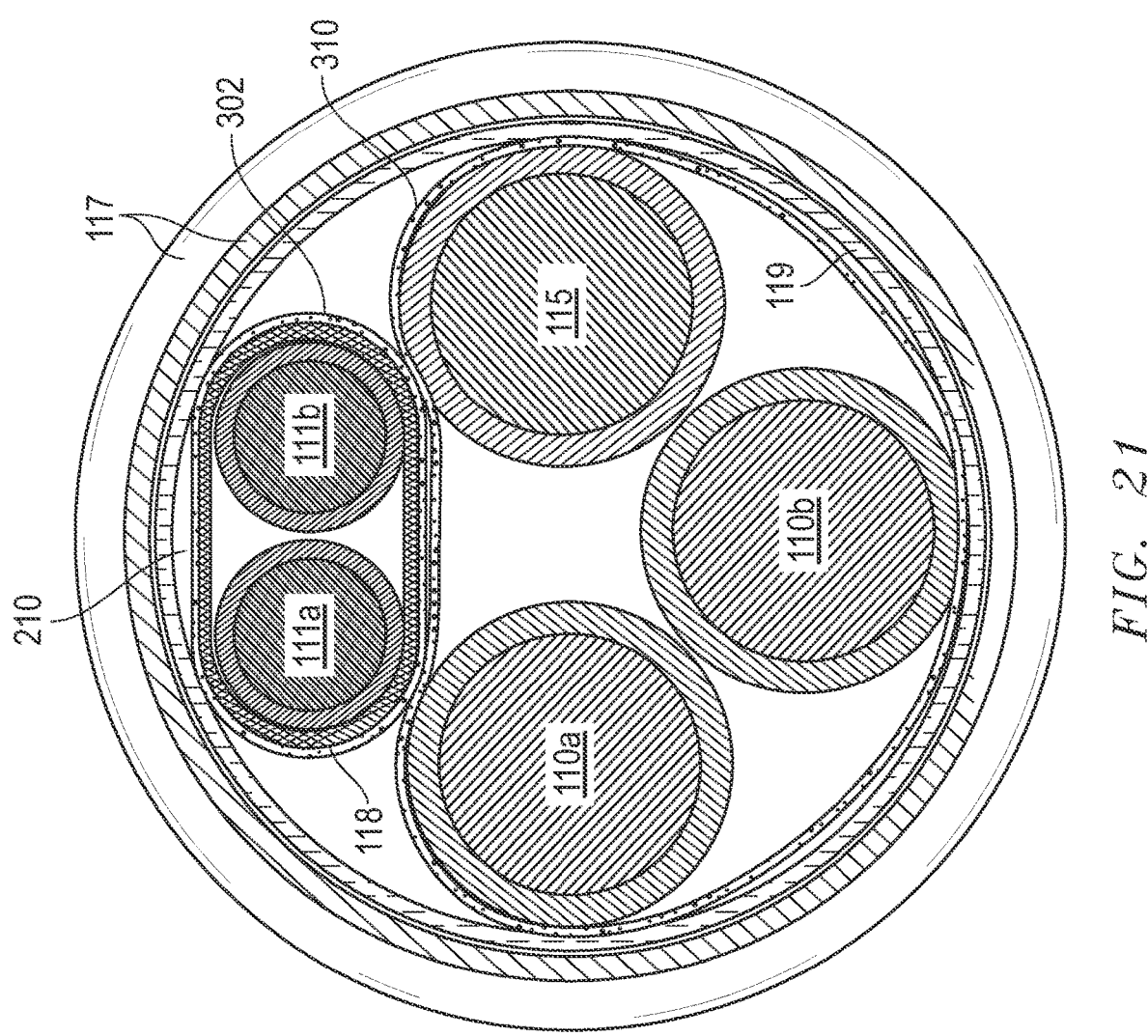
FIG. 21 is an end view of a metal-clad multi-circuit electrical cable assembly in accordance with one embodiment of the invention.

Referring to FIGS. 20 and 21, an alternate embodiment of the invention shown in a partial cutaway perspective view and an end view of a metal-clad multi-circuit electrical cable assembly. FIGS. 20 and 21 show one embodiment of the invention in which the Class 2/3 circuit 210 includes a wrap 302 encasing the nonconductive insulating jacket 118 which encases conductors 111*a-b* and in which the Class 1 circuit 200 includes a wrap 310 encasing the insulated phase conductors 110*a-b* as well as the insulated ground conductor 115. The wraps 302 and 310 act as additional barriers between the conductors 111*a-b* and the insulated phase conductors 110*a-b* as well as the insulated ground conductor 115. The wraps 302 and 310 may be formed from a variety of materials, including, but not limited to, polyvinyl chloride (PVC), Mylar®, or plastic. Additionally, the wraps 302 and 310 may take the form of a variety of application styles, including, but not limited to, tape, separator tape, and shield. Assembly of both wrap 302 which is applied to the insulating jacket 118 which encases conductors 111*a-b* and wrap 310 which is applied to the insulated phase conductors 110*a-b* may be applied helically or longitudinally without detracting from the spirit of the invention. In one embodiment the wraps 302 and 310 are made from the same materials, are applied in the same application style, and assembly of both are applied in the same way, either helically or longitudinally. In another embodiment, the wraps 302 and 310 may be made from different materials, may be applied in different application styles, or may be assembled differently from each other.

Figure 22:
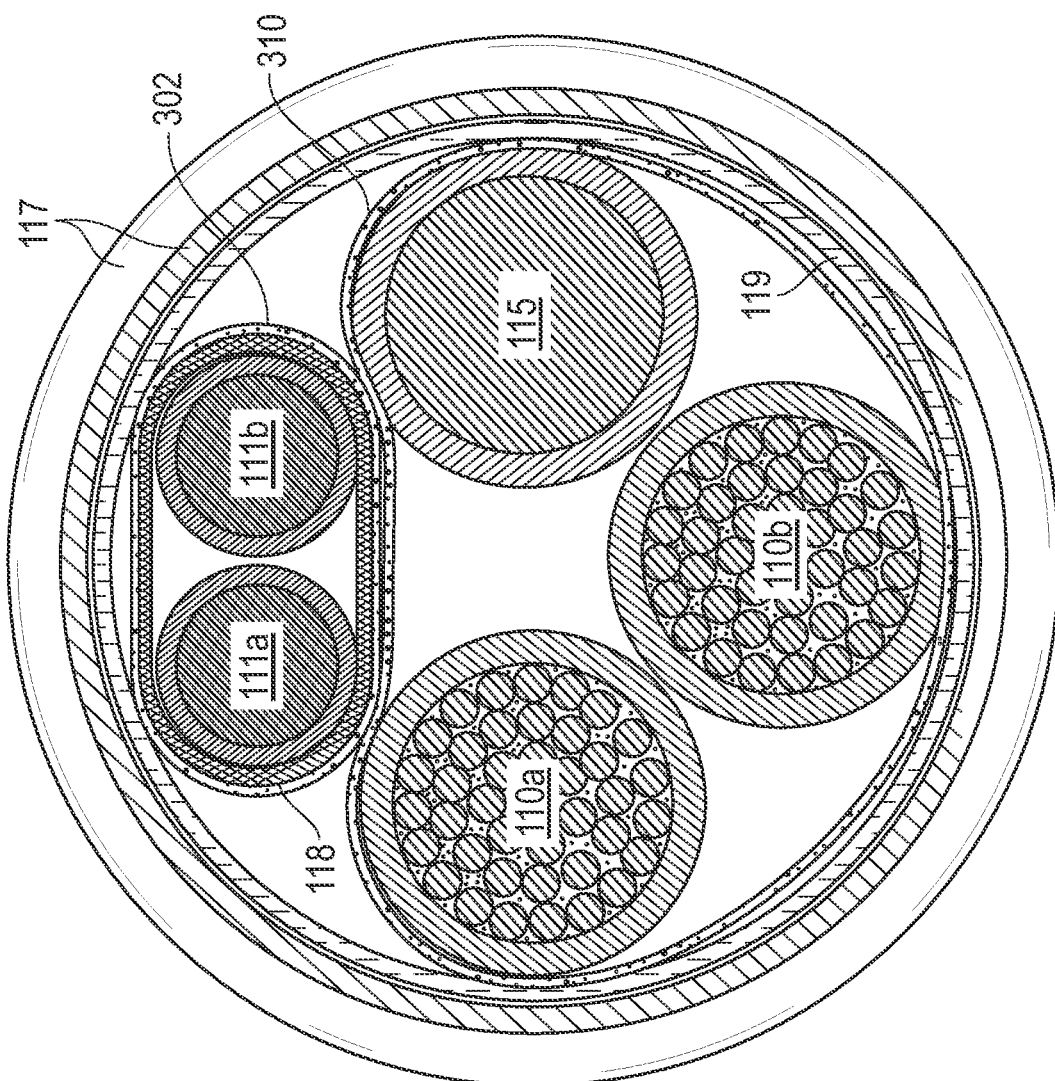
FIG. 22 is an end view of a metal-clad multi-circuit electrical cable in accordance with one embodiment of the invention.

FIG. 22 is an end view of one embodiment of the invention in which the insulated phase conductors 110a-b are formed of stranded copper, the Class 2/3 circuit 210 includes a wrap 302 encasing the nonconductive insulating jacket 118 which encases conductors 111a-b, and the Class 1 circuit 200 includes a wrap 310 encasing the insulated phase conductors 110a-b as well as the insulated ground conductor 115.

Figure 23:
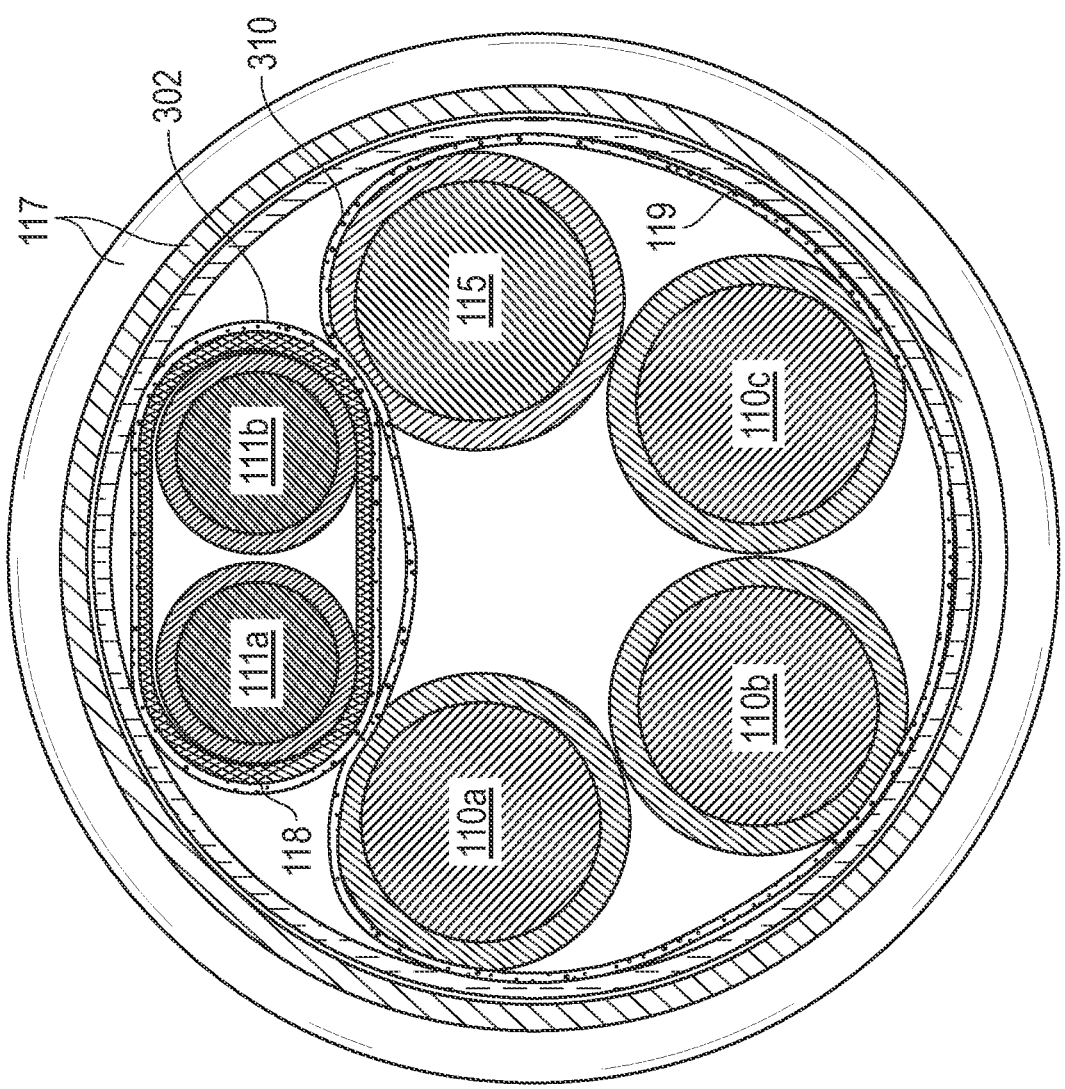
FIG. 23 is an end view of a metal-clad multi-circuit electrical cable in accordance with one embodiment of the invention.

FIG. 23 is an end view of one embodiment of the invention in which the Class 1 circuit 200 includes three insulated phase conductors 110a-c as well as the insulated ground conductor 115, the Class 2/3 circuit 210 includes a wrap 302 encasing the nonconductive insulating jacket 118 which encases conductors 111a-b, and the Class 1 circuit 200 includes a wrap 310 encasing the three insulated phase conductors 110a-c as well as the insulated ground conductor 115. This four-conductor Class 1-rated circuit 200 may carrying dual- or split-phase AC power.

FIG. 24 is an end view of one embodiment of the invention in which the Class 1 circuit 200 includes four insulated phase conductors 110a-d as well as the insulated ground conductor 115, the Class 2/3 circuit 210 includes a wrap 302 encasing the nonconductive insulating jacket 118 which encases conductors 111a-b, and the Class 1 circuit 200 includes a wrap 310 encasing the four insulated phase conductors 110a-d as well as the insulated ground conductor 115. This five-conductor Class 1-rated circuit 200 may carrying three-phase AC power.

It should be apparent to one skilled in the art that, for purposes of the present disclosure, the physical disposition and relative positions of various conductors within the metal-clad cable assembly (particularly as depicted in the section views shown in FIGS. 2, 4, 7, 8, 9, 11, 12, 13, 14, 16, 17, 18, 19, 21, 22, 23, and 24), are merely representative dispositions intended for illustration, not limitation. The manner in which a metal-clad cable assembly is constructed, typically including a right- or left-hand twist imparted to conductors as they are laid within an assembly, may cause various conductors therein to change position relative to one another as one moves along the length of the assembly. FIG. 2, for example, shows an end view in which the insulated ground conductor 115 is depicted in the three o'clock position of the end view; the insulated phase conductors 110a-b are shown in the six o'clock and nine o'clock positions; and the separately-jacketed pair of Class 2/3 conductors 111a-b are shown at the twelve o'clock position. Yet if one were to cut through the cable assembly a few inches up or down its length from the section view shown in FIG. 2, this new section view revealed by the new cut would likely show a very different arrangement of the various conductors therein, with respect to one another, as a result of the construction of the assembly.

Although the invention is described herein with reference to specific embodiments, various modifications and changes can be made without departing from the scope of the invention as set forth in the claims below. Accordingly, the specification and figures are to be regarded in an illustrative rather than a restrictive sense, and all such modifications are intended to be included within the scope of the invention. Any benefits, advantages, or solutions to problems that are described herein with regard to specific embodiments are not intended to be construed as a critical, required, or essential feature or element of any or all the claims.

From time-to-time, the invention is described herein in terms of these example embodiments. Description in terms of these embodiments is provided to allow the various features and embodiments of the invention to be portrayed in the context of an exemplary application. After reading this description, it will become apparent to one of ordinary skill in the art how the invention can be implemented in different and alternative environments. Unless defined otherwise, all technical and scientific terms used herein have the same meaning as is commonly understood by one of ordinary skill in the art to which this invention belongs.

The preceding discussion is presented to enable a person skilled in the art to make and use the invention. The general principles described herein may be applied to embodiments and applications other than those detailed below without departing from the spirit and scope of the invention as defined by the appended claims. The invention is not intended to be limited to the embodiments shown, but is to be accorded the widest scope consistent with the principles and features disclosed herein.

In addition, while a particular feature of the invention may have been disclosed with respect to only one of several embodiments, such feature may be combined with one or more other features of the other embodiments as may be desired. It is therefore, contemplated that the claims will cover any such modifications or embodiments that fall within the true scope of the invention.

The various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one", "one or more" or the like; and adjectives such as "conventional", "traditional", "normal", "standard", "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more", "at least", "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Unless stated otherwise, terms such as "first" and "second" are used to arbitrarily distinguish between the elements such terms describe. Thus, these terms are not necessarily intended to indicate temporal or other prioritization of such elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the field or any related fields are intended to be within the scope of the following claims.

What is claimed is:

1. An electrical cable assembly, comprising:
   a first electrical circuit comprising at least two insulated conductors;
   a second electrical circuit comprising:
      at least two control insulated conductors;
      a jacket surrounding the control insulated conductors;
      a wrap surrounding the jacket which is surrounding the control insulated conductors; and
   a conductive metallic armor encasing the first and second electrical circuits, wherein the conductive metallic armor provides a return ground path.

2. The electrical cable assembly of claim 1, wherein the wrap is helically encasing the jacket.

3. The electrical cable assembly of claim 1, wherein the wrap is longitudinally encasing the jacket.

4. The electrical cable assembly of claim 1, wherein the insulated conductors are power supply insulated conductors.

5. The electrical cable assembly of claim 1, wherein the control insulated conductors are signal insulated conductors.

6. The electrical cable assembly of claim 1 further comprising color-coded labels applied to the metallic armor.

7. The electrical cable assembly of claim 1, wherein the metallic armor is formed from aluminum.

8. The electrical cable assembly of claim 1, wherein the metallic armor is formed from steel.

9. The electrical cable assembly of claim 1, wherein the metallic armor is coated with polyvinyl chloride (PVC).

10. The electrical cable assembly of claim 1, wherein the control insulated conductors include two control insulated conductors helically twisted about one another.

11. The electrical cable assembly of claim 1, wherein the jacket is formed from polyvinyl chloride (PVC).

12. The electrical cable assembly of claim 1, wherein the insulated conductors include at least three insulated conductors.

13. The electrical cable assembly of claim 12, wherein the at least three insulated conductors include an insulated ground conductor.

14. The electrical cable assembly of claim 1, wherein the wrap is formed from Mylar.

15. The electrical cable assembly of claim 1, wherein the insulated conductors include a Nylon jacket.

16. The electrical cable assembly of claim 1, wherein the wrap is a tape.

17. The electrical cable assembly of claim 1, wherein the control insulated conductors include at least two control insulated conductors.

18. The electrical cable assembly of claim 17, wherein the two control insulated conductors include a Nylon jacket.

19. The electrical cable assembly of claim 1 further comprising a separator tape surrounding the first and second electrical circuits.

20. The electrical cable assembly of claim 19, wherein the separator tape is located within the metallic armor.

* * * * *